US012085461B2

(12) United States Patent
Burghoorn et al.

(10) Patent No.: US 12,085,461 B2
(45) Date of Patent: Sep. 10, 2024

(54) PRESSURE SENSOR LAMINATED ONTO A TEXTILE SHEET, A METHOD FOR MANUFACTURING THEREOF, AND A PRESSURE DISTRIBUTION SENSING PRODUCT

(71) Applicant: Nederlandse Organisatie voor toegepast-natuurwetenschappelijk onderzoek TNO, 's-Gravenhage (NL)

(72) Inventors: Maria Mathea Antonetta Burghoorn, Geldrop (NL); Peter Zalar, Eindhoven (NL); Jeroen Van Den Brand, Goirle (NL); Daniele Raiteri, Eindhoven (NL); Edsger Constant Pieter Smits, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 376 days.

(21) Appl. No.: 17/599,940

(22) PCT Filed: Apr. 17, 2020

(86) PCT No.: PCT/NL2020/050259
§ 371 (c)(1),
(2) Date: Sep. 29, 2021

(87) PCT Pub. No.: WO2020/214037
PCT Pub. Date: Oct. 22, 2020

(65) Prior Publication Data
US 2022/0196492 A1 Jun. 23, 2022

(30) Foreign Application Priority Data
Apr. 17, 2019 (EP) ..................................... 19169780

(51) Int. Cl.
*G01L 1/20* (2006.01)
*G01L 1/22* (2006.01)

(52) U.S. Cl.
CPC ............ *G01L 1/205* (2013.01); *G01L 1/2287* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 5,265,904 A    11/1993 Shelton et al.
7,260,999 B2*   8/2007 Divigalpitiya ......... H01H 1/029
                                                      73/774

(Continued)

FOREIGN PATENT DOCUMENTS

CN    108896214 A     11/2018
EP      2698616 A2 *   2/2014  ............... A61G 5/00
(Continued)

OTHER PUBLICATIONS

European Patent Office, International Search Report in corresponding International Application No. PCT/NL2020/050259, dated Jul. 17, 2020 (3 pages).
(Continued)

*Primary Examiner* — Andre J Allen
(74) *Attorney, Agent, or Firm* — Leydig, Voit & Mayer, Ltd.

(57) ABSTRACT

The present disclosure concerns a pressure sensor, comprising at least two adjacent electrically conductive leads disposed in a pattern on a face of a first elastomeric carrier; and an electrically resistive layer formed of a electrically resistive composite material for shunting the at least two adjacent electrically conductive leads, said electrically conducting
(Continued)

layer disposed on a face of a second elastomeric carrier. The first and second carriers are stacked across a spacer such that the at least two adjacent electrically conductive leads faces the electrically resistive layer across a gap defined by the spacer. The gap is formed by a pocket between the carriers. The first carrier including the at least two adjacent electrically conductive leads and/or the second carrier including the electrically resistive layer are stretchable such as to upon receiving a force, exerted in a direction across the gap, reduce the gap between the electrically resistive layer and the at least two adjacent electrically conductive leads. Upon closing the gap the adjacent electrically conductive leads are shunted over a force dependent contact area and contact resistance. A gas in a gas confining structure between the carriers at least partly counteracts the exerted force.

20 Claims, 12 Drawing Sheets

(58) Field of Classification Search
CPC ............ G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/065; G01L 9/12; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0069; G01L 19/0015; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 11/008; G01L 7/22; G01L 13/026; G01L 13/00; G01L 9/0047; G01L 9/0025; G01L 9/0076; G01L 7/08; G01L 9/0035; G01L 19/0061; G01L 9/0005; G01L 9/0041; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 19/083; G01L 9/0057; G01L 9/00; G01L 19/10; G01L 19/16; G01L 19/06; G01L 9/0016; G01L 9/0048; G01L 13/023; G01L 7/048; G01L 9/0027; G01L 9/0086; G01L 9/0079; G01L 11/04; G01L 9/0091; G01L 1/20; G01L 11/002; G01L 23/24; G01L 27/00; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 9/0092; G01L 21/04; G01L 9/0045; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 11/06; G01L 9/0097; G01L 1/146; G01L 1/2268; G01L 21/30; G01L 21/34; G01L 23/221; G01L 7/187; G01L 7/20; G01L 23/26; G01L 7/068; G01L 1/225; G01L 23/32; G01L 7/14; G01L 1/144; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/166; G01L 7/185; G01L 1/255; G01L 21/08; G01L 5/0057; G01L 5/1627; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

See application file for complete search history.

(56) References Cited

U.S. PATENT DOCUMENTS

| | | | | |
|---|---|---|---|---|
| 9,027,408 | B2* | 5/2015 | Toth | A61B 5/4848 |
| | | | | 601/48 |
| 9,826,625 | B2* | 11/2017 | Vandeparre | H05K 1/0271 |
| 10,401,240 | B2* | 9/2019 | Lee | G01L 1/2287 |
| 10,634,482 | B2* | 4/2020 | Pegan | A61B 5/113 |
| 2006/0162471 | A1 | 7/2006 | Bieck et al. | |
| 2006/0272429 | A1 | 12/2006 | Ganapathi et al. | |
| 2012/0258302 | A1 | 10/2012 | Hunt et al. | |
| 2017/0350772 | A1 | 12/2017 | DeGanello et al. | |
| 2018/0003579 | A1 | 1/2018 | Esposito et al. | |
| 2019/0391024 | A1* | 12/2019 | Yamada | G01L 1/2287 |

FOREIGN PATENT DOCUMENTS

| | | |
|---|---|---|
| JP | 1054768 A | 2/1998 |
| JP | 10214537 A | 8/1998 |
| JP | 2009115472 A | 5/2009 |
| JP | 2015232490 A | 12/2015 |
| WO | WO 2014/204323 A1 | 12/2014 |

OTHER PUBLICATIONS

National Intellectual Property Administration, PRC, Office Action in corresponding Chinese Patent Application No. 2020800292465, dated Nov. 25, 2023.

Japanese Patent Office, Notification of Reasons for Rejection in corresponding Japanese Patent Application No. 2021-561864 dated Feb. 20, 2024.

* cited by examiner

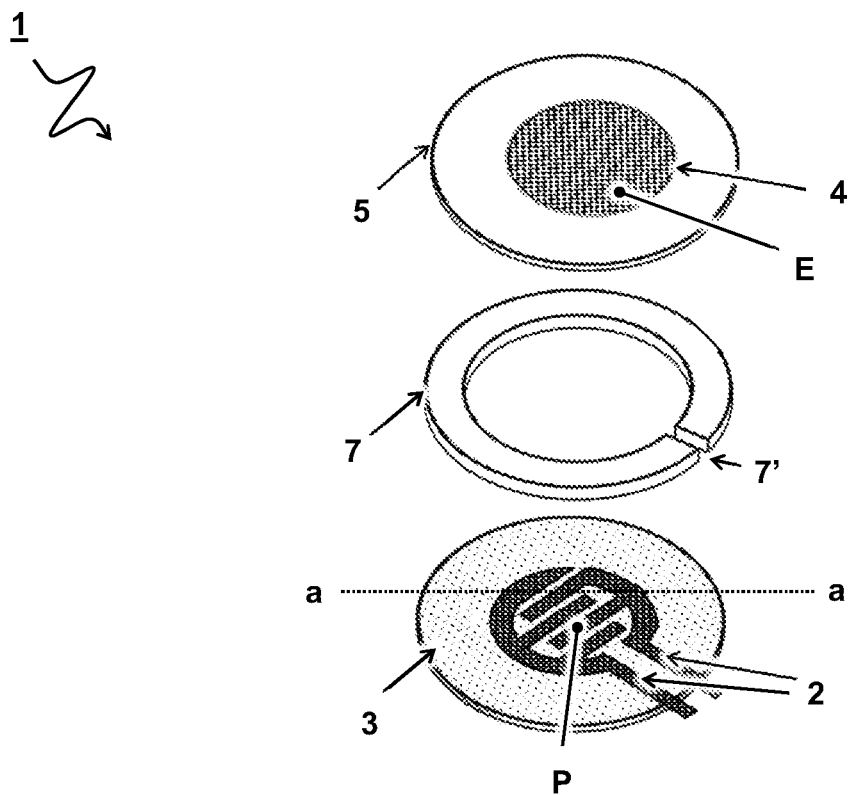
FIG 1A
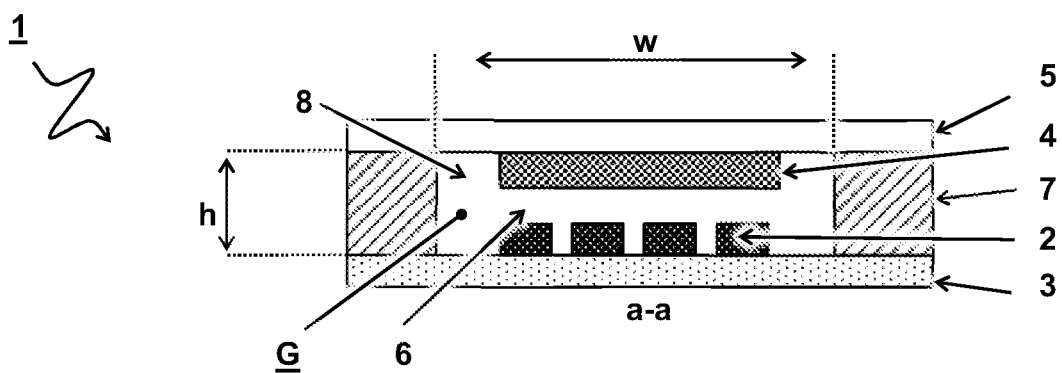
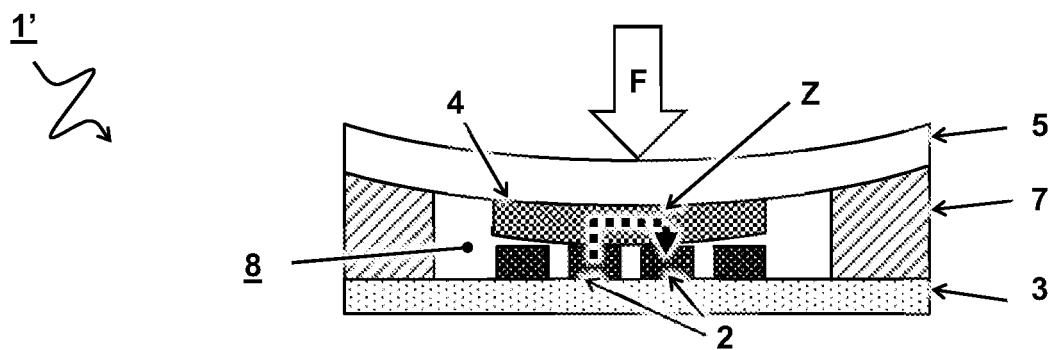
FIG 1B

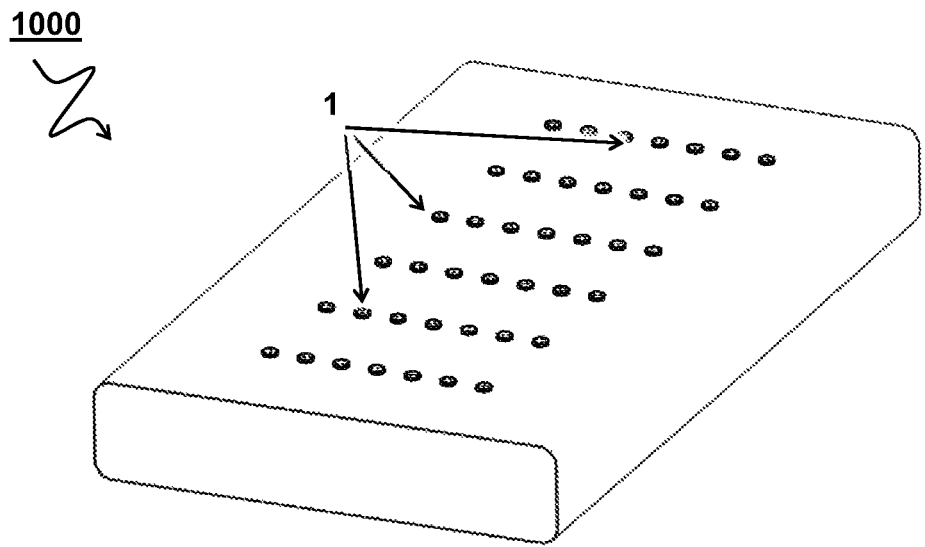
FIG 8A
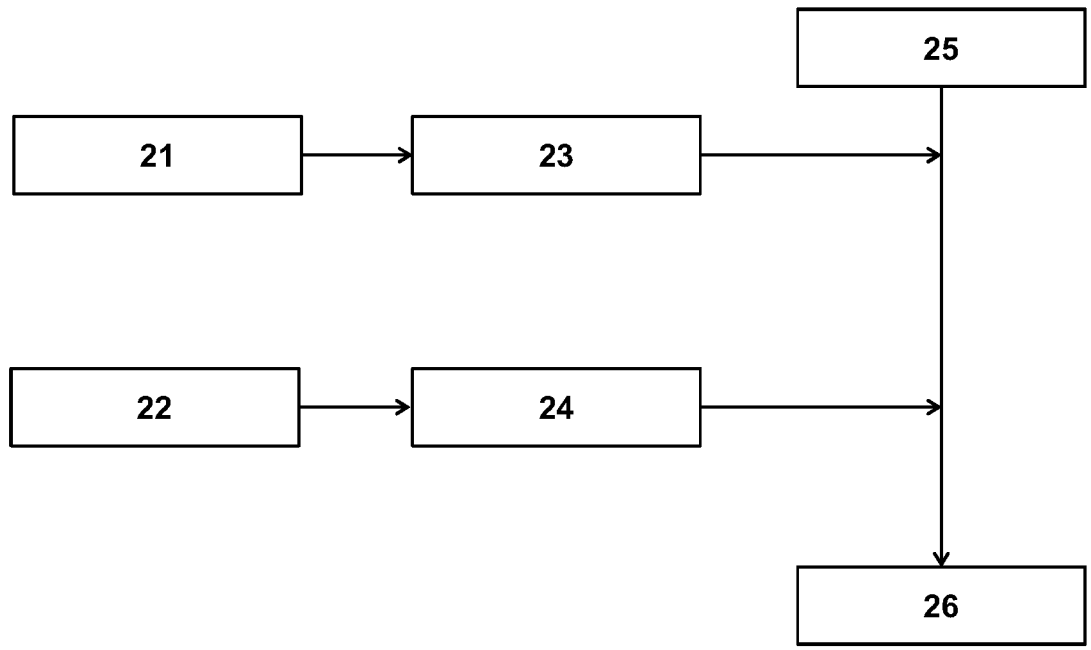
FIG 8B

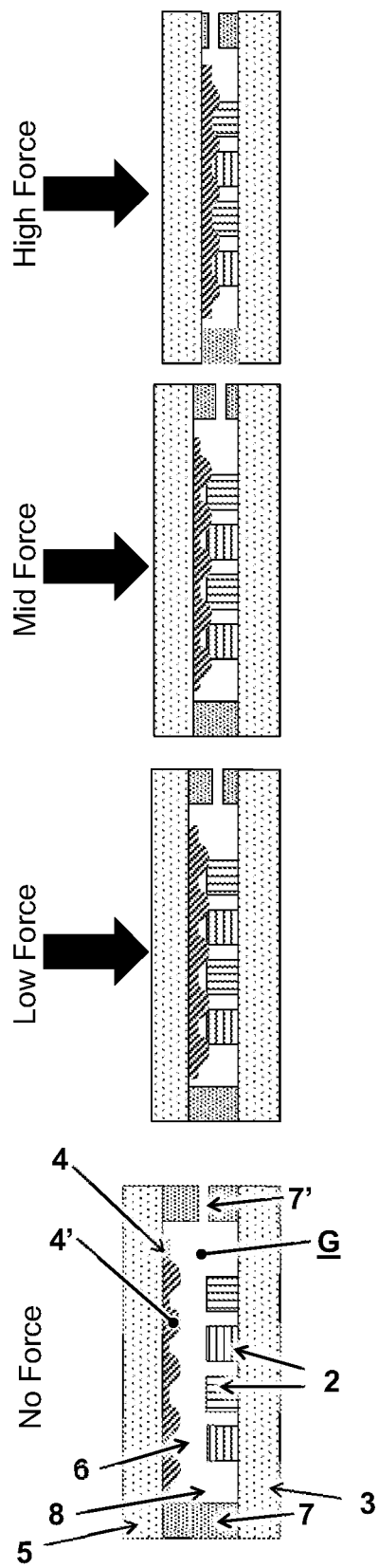
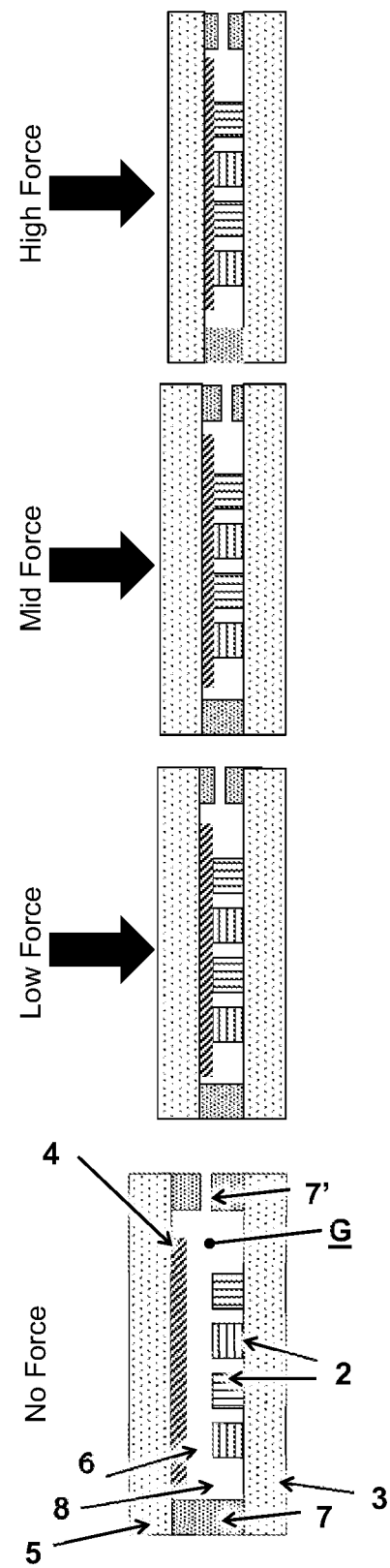
FIG 11A                    FIG 11B

PRESSURE SENSOR LAMINATED ONTO A TEXTILE SHEET, A METHOD FOR MANUFACTURING THEREOF, AND A PRESSURE DISTRIBUTION SENSING PRODUCT

CROSS-REFERENCE TO RELATED APPLICATIONS

This patent application is a U.S. National Phase of PCT International Application No. PCT/NL2020/050259, filed Apr. 17, 2020, which claims priority to European Application No. 19169780.4, filed Apr. 17, 2019, which are both expressly incorporated by reference in their entireties, including any references contained therein.

TECHNICAL FIELD AND BACKGROUND

The present disclosure relates to pressure sensitive resistance based force sensors, in particular elastomeric products comprising membrane type resistance based pressure sensors and methods for the manufacturing thereof.

Force sensing resistors (FSR) sensors typically comprise a layer of a force dependent resistor material which is making directly contact to the electrodes. A variety of FSR inks are known from which such layers may be formed. Typically these materials comprise an elastomeric matrix material (e.g. rubbers such as PDMS) mixed with a conductive filler particles (carbon nanotubes, graphite) below or around the percolation threshold. Upon compressing of the material, the percolation threshold may be lowered which may be accompanied with new conductive pathway being formed across the matrix via the conductive filler particles. U.S. Pat. No. 3,806,471 discloses an FSR material formed from (semi)conducting particles dispersed in a compressible (elastomeric) material. In other cases the sensitivity towards pressure of the direct contacted material is enhanced using voids in the film such as described in U.S. Pat. No. 9,278,856. Here the flexible sensing material contains carbon nanotubes.

Alternatively, FSR have been constructed using a electrically resistive material applied in force sensors formed of parallel membrane structures separated across a gap as described in U.S. Pat. No. 5,033,291. In such type of devices two distinct modes of operation can be discerned. In the first, the so-called 'through mode' the applied force is correlated to an electrical current running form a circuit on a first membrane via the electrically resistive material to a separate circuit on the second membrane. When pressure is applied the layers contact which can be registered by resistance change between the circuits. A disadvantage of 'through' type sensors is that a complex wiring scheme and/or further high resolution alignment during assembly are required. Furthermore, since circuitry is required on both layers across the gap, 'through' type sensors are more difficult to interface. U.S. Pat. No. 6,909,354 discloses a 'shunt' type force sensor wherein a electrically resistive layer membrane is suspended over an interdigitated finger circuit. Upon pressing the sensor, the interdigitated circuit is shunted by the electrically resistive layer. A disadvantage of the shunt mode is that these typically suffer from less ideal sensitivity curves due to a non-uniform force-resistance relation, e.g. small changes in applied force may result in a large observed resistance changes, and conversely, large changes in applied force may result in small variations in resistance. Typically, this is resolved by forming the finger electrodes using high resolution manufacturing techniques. Problems thereof include that such techniques are unfavorable in mass manufacturing. U.S. Pat. No. 6,964,205 discloses a sensor that may be employed to detect force distributions of a seating surface. The sensor includes at least one substrate layer, a plurality of sensing elements operatively arranged with respect to the substrate layer and a conductive trace disposed on the substrate layer. By employing slits or cut-outs the sensor may move independent of an adjacent sensor, allowing the sensor to conform to an irregularly shaped surface. Disadvantages include that the provision of slits or cuts-out is unfavorable in mass manufacturing and the rigid sensor foil is experienced as uncomfortable. Further there remains a need to provide pressure sensors with an improved long-term repeatability. The present invention overcomes at least one of these or further disadvantages by providing a pressure sensor as described herein that can be integrated into a textile product.

SUMMARY

A first aspect of the present disclosure relates to a pressure sensor laminated onto a textile sheet. The pressure sensor comprising at least two adjacent electrically conductive leads disposed in a pattern on a face of a first carrier and an electrically resistive layer formed of a composite material for shunting the at least two adjacent electrically conductive leads, said electrically resistive layer being disposed on a face of a second carrier. The first and second elastomeric carriers are stacked across a spacer such that the at least two adjacent electrically conductive leads face the electrically resistive layer across a gap defined by the spacer to form a pocket structure defining a gas confining structure that is filled with a gas that at least partly counters a force (F) exerted on the pressure sensor. The first carrier includes the at least two adjacent electrically conductive leads and the second carrier includes the electrically resistive layer. The carriers are stretchable such as to upon receiving the force (F), exerted in a direction across the gap, the gap is reduced between the electrically resistive layer and the at least two adjacent electrically conductive leads to shunt the at least two adjacent electrically conductive leads with the resistive composite material (E) over a contact area (A) in dependence of the received force. This results in a pressure dependent electrical resistance between the conductive leads. The pocket structure is provided with a relief structure of micro bumps and an opening to reduce the counter force of the gas, said opening dimensioned to impede the gas from exiting the pocket. The stretchable first carrier and the stretchable second carrier, including their respective conductive leads and resistive layer, may upon receiving inplane and/or out of plane forces flex towards each other, to upon contact shunt the at least two adjacent electrically conductive leads. By forming the adjacent electrically conductive leads and/or the electrically resistive layer from a stretchable material, said conductive leads and layers upon contact deform to form a pressure dependent conductivity towards the electrodes. Consequently, also the electrical resistance between the at least two adjacent electrically conductive leads depends on said pressure.

As described above, the sensor comprises a pocket between the carriers. An initial separation distance, i.e. an initial first dimension (thickness) of the pocket, i.e. an initial distance across the gap, may be defined by the distance between the carriers in rest, i.e. in an initial position, e.g. without application of the external force. Accordingly, a thickness of the spacer may define the vertical offset of the gap. A width of the pocket, i.e. a dimension of the pocket along the carriers, may be defined by opposing sidewall portions of the separator. Alternatively, a width of the pocket may be defined between sidewall portions of adjacent spacers. The width of the pocket may further define the distance over which the carriers are unsupported. The elastic modulus of the carriers contributes to restoring the gap upon removal of the force. As described above, the pocket, including the opening therein, defines a gas confining structure between the carriers that is filled with a gas that at least partly counteracts the exerted force. A gas confining structure may be understood to at least restrict gas flow, preferably fix the total amount of gas within the sensor structure, e.g. from with the structure to a volume outside the structure. A restricted gas flow may be understood to include a restricted gas flow within a time frame of a pressure sensing event of the sensor. A gas may be understood to include air, e.g. ambient air. Inventors find that a reduction of the separation distance between the carriers and accordingly a reduction the volume of the pocket causes a compression of the gas confined in the pocket and/or a displacement of gas from the pocket. Without wishing to be bound by theory inventors believe that such compression and/or displacement of gas from the pocket, e.g. via gas restricting pores, at least partly counteracts the exerted force and dampens the displacement of the membranes. Inventors further found that including microstructured bumps onto one or both of the sensor layers will allow distribution of pressure, enabling partial shunt within the tops of the bumps. The gas may reside within the valleys between the microstructured bumps.

Inventors found that a reduction of the separation distance between the carriers, e.g. upon receiving an external force, causes a compression of the gas. By providing the pressure sensor with stretchable first and second carriers and a stretchable spacer, the sensor as a whole may be stretchable and/or flexible. Particularly, for application in textiles, the sensor preferably has a low Youngs modulus and thickness ensuring conformable coverage under tension. Matching the stretchability of the sensor to the stretchability of the textile may improve the comfort for a user, e.g. a person wearing a textile product comprising the pressure sensor. Many textiles are stretchable over a length direction by at least 5%, or even by at least 10% or more. Preferably, the thickness of the sensor does not exceed 5 mm. For application in textile products the thickness is preferably less, e.g. lower than 2 mm or even lower such as about 1 or lower than about 0.5 mm, e.g. in a range between 0.5 and 0.1 mm. A minimum thickness of the pressure sensor will be limited by the combined thickness of the carriers, the leads, shunting layer, and the distance across the gap, i.e. the height of the pocket and/or the thickness of the spacer. It will be appreciated that the term textile is not to be construed limited to wovens; textile may also include other types of cloths such as leather, and/or rubbers such as latex.

A second aspect of the present disclosure relates to a method for manufacturing a pressure sensor. Preferably a pressure sensor according to the first aspect of the invention and any of the embodiments described herein. The method comprises providing a first carrier, a second carrier and a spacer. The method further comprises providing at least two adjacent electrically conductive leads in a pattern on a face of a carrier, e.g. the first carrier. Onto a face of the other carrier, e.g. the second carrier, a composite material is deposited to form an electrically conducting layer. This electrically conducting layer has a conductivity suitable for shunting the at least two adjacent electrically conductive leads. After providing the electronically conductive leads and depositing the electrically resistive layer the method comprises stacking the first and second carriers across the spacer such that the at least two adjacent electrically conductive leads face the electrically resistive layer across a gap defined by the spacer, wherein the gap is a pocket defining a gas confining structure between the carriers that is filled with a gas that at least partly counteracts the exerted force.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 1A schematically depicts a perspective view of an embodiment of a pressure sensor;

FIG. 1B schematically depicts cross-section side views of an embodiment of a pressure sensor in rest and under compression;

FIG. 8A schematically depicts a perspective view of an embodiment of a matrass comprising an array of pressure sensors; and FIG. 8B schematically depicts an embodiment of a method for manufacturing a pressure sensor;

FIGS. 11A and B schematically embodiments of pressure sensors with and without microstructure relief pattern under application of external force;

DESCRIPTION OF EMBODIMENTS

Figure 2A:
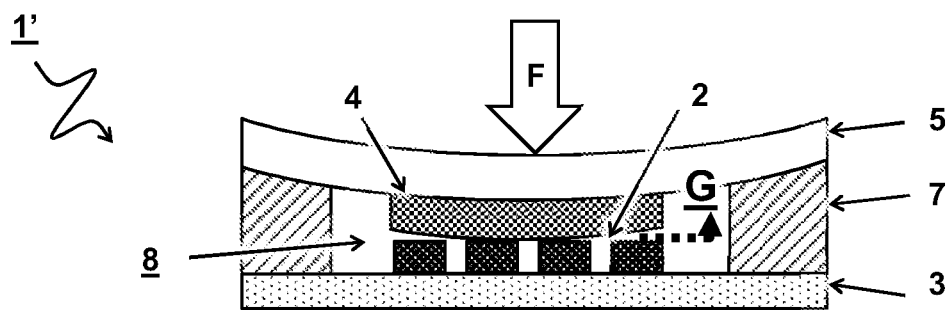
FIGS. 2A and B schematically depict redistribution of gas in cross-section side views of embodiments of a pressure sensor under compression.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

As used herein, the percolation threshold may be considered as a mathematical concept related to percolation theory, which is the formation of long-range connectivity in random systems. Above the threshold a giant connected component typically exists of the order of system size. By providing a volumetric ratio of a micro-particles with respect to a dielectric matrix well above a percolation threshold, it may be ensured that the micro-particles form a connected component throughout the dielectric matrix on the order of a size of the electrode gap. This may typically be achieved by providing the micro-particles with a relatively high packing density, e.g. more than 0.3 (thirty percent) vol %, preferably more than 0.5 vol %. The minimum desired ratio can also be measured experimentally from the conductivity or resistance behavior of the sensor material. For example, the ratio of the micro-particles with respect to the dielectric matrix is preferably sufficiently high to have a conductivity of the sensor material approach that of the pure volumetric resistance of the material. For typical materials this may correspond to a volume ratio of the micro-particles with respect to the dielectric matrix of more than 30%.

Elastomeric materials and stretchable layers and/or stretchable materials for use in the pressure sensor may be understood to be stretchable along at least a first direction by at least a specified amount without essentially irreversibly loosing functionality. In other words, a stretchable or elastomeric material (layer) may be understood to be a material (layer) which may be stretched from an initial dimension along a direction to a dimension which is a multiple of its initial dimension. For example carriers defined to be stretchable by at least 20% may be elongated to a stretched dimension 1.2 times the original dimension. As used herein, "stretchable without essentially loosing functionality" may be understood to include stretchable without tearing. Further, a material (layer) stretchable in a first direction may be understood to be compressible in second orthogonal direction.

As used herein electrically resistive layers such as the shunting layer and/or electrically resistive materials may be understood include materials and/or layers with a conductivity between than of an electrical insulator and a good electrical conductor such as metals including copper. A electrically resistive layers may be understood to have a moderate resistivity, e.g. a sheet resistivity in a range between 1 k$\Omega$/cm$^2$ and 500 k$\Omega$/cm$^2$, e.g. 5 k$\Omega$/cm$^2$ or 200 k$\Omega$/cm$^2$, preferably sheet resistivity in a range between 10 k$\Omega$/cm$^2$ and 100 k$\Omega$/cm$^2$, e.g. about 30 or about 50 k$\Omega$/cm$^2$. For electrically resistive layers (shunting layers) "stretchable without essentially loosing functionality" includes being able to accommodate in plane deformations up to 20%, e.g. upon receiving a force exerted in a direction across the gap without irreversibly loosing electrical conductivity.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

It is noted that a pocket structure as defined may not be limited to a single pair of opposing electrically conductive leads and electrically resistive layer (shunting layer). A pocket structure may stretch out between multiple sensors, i.e. a plurality of leads and shunting layers may share a pocket structure. Further, a pockets structure may comprise a plurality of interconnected compartments such that gas under pressure in a first compartment may be redistributed over other compartments.

FIG. 1A schematically depicts an exploded perspective view of an embodiment of a pressure sensor 1. The embodiment, e.g. as shown, comprises: a first elastomeric carrier 3 including two adjacent electrically conductive leads 2 in a interdigitate finger pattern P; a second elastomeric carrier 5 including a FSR electrically resistive layer 4; the first and second carriers being separated by a spacer 7. For reasons of clarity the second carrier 5 is depicted transparent as to not obstruct the view on the electrically resistive layer 4.

FIG. 1B schematically depicts cross-section side views of the pressure sensor 1 in an initial state, e.g. without external force F; and the pressure sensor in a state 1' with an external force F.

In agreement with the first aspect of the invention, the pressure sensor 1 as shown comprises two adjacent electrically conductive leads 2 disposed in a pattern P on a face of a first carrier 3; and an electrically resistive layer 4 formed of a composite material E for shunting the at least two adjacent electrically conductive leads 2. Said electrically resistive layer 4 is disposed on a face of a second carrier 5. The first and second carriers 3,5 are stacked across a spacer 7 such that the adjacent electrically conductive leads face the electrically resistive layer 4 across a gap 6 defined by the spacer 7.

It will be appreciated that the sensor is not to be construed to be limited to the depicted orientation and placement of conductive elements. For example, the pressure sensor 1 may also be constructed with the electrically resistive layer 4 provided on the first carrier 3 and least two adjacent electrically conductive leads 2 provided on the second carrier 5.

In the embodiment as shown, the second carrier 5 including the electrically resistive layer is stretchable such as to upon receiving a force F, exerted in a direction across the gap 6, reduce the gap 6 between the electrically resistive layer 4 and the at least two adjacent electrically conductive leads 2 to shunt the at least two adjacent electrically conductive leads 2 closing an electrical circuit, marked "Z", between leads. The total resistivity of the circuit may be understood to be a sum of the bulk resistivity of the leads and the bulk resistivity of the electrically resistive layer 4 (shunting layers) and a contact resistance between the leads and the shunting layer. Noted that the overall resistivity varies with the area A over which a contact is formed between the electrically resistive layer 4 and the leads. The gap 6 is formed by a pocket 8 between the carriers. The height "h" of the pocket defines the distance across the gap. The width "w" of the pocket 8 is defined by the distance between opposing sidewall portions of the spacer 7. The pocket is filled with a gas "G" that, in use, at least partly counteracts the exerted force F. The width of the pocket also defines the span over which the carriers are not supported by the spacer. When in rest, e.g. without external force, the gas contributes to keeping the carriers separated over the gap.

In some preferred embodiments the gas contributes, upon release of the exerted force, in separating the one or more layers (carriers) comprised in the pressure sensor 1.

Onto one of the stretchable carriers is provided the least two adjacent electrically conductive leads. These leads may be formed of a pair of adjacent electrically conductive leads spaced at distance over a length and in a shape defined by the pattern "P". The pattern includes at least two parallel adjacent leads separated at a distance. Patterns may also include interdigitated finger electrode designs. Alternatively, the pattern may define a plurality of adjacent conductive leads, e.g. 3, 4 or more leads separated over a distance. Further alternative, the at least two adjacent electrically conductive leads 2 may be formed by a single conductive track with adjacent portions meandering at a distance form each other.

It will be appreciated that the electrically conductive leads are formed of a composition comprising an electrically conductive material. The composition may be formed of a mixture of an electrically insulating material and a conductive material such as conductive particles. In a preferred embodiment, the mixture is formed of a polymeric stretchable binder, forming a matrix, and a conductive network of electrically conductive particles. Preferably, electrically conductive particles are selected from the group consisting of metal particles and metal nanoparticles, metal containing particles and nanoparticles, graphite particles and nanoparticles, carbon particles and nanoparticles, carbon nanowires, conductive polymer particles and nanoparticles, and mixtures thereof, more preferably selected from the group consisting of silver containing particles, silver particles, copper particles, copper containing particles, silver nanowires, copper nanowires, graphite particles, carbon particles and mixtures thereof, and even more preferably selected from graphite particles, carbon particles and mixtures thereof. It will be appreciated that the mixture may optionally comprise other conductive materials such as conductive polymers or other additives such as stabilizers.

In some embodiments the conductive leads comprise a tab 11 (see FIG. 4B) for connecting to a device for measuring a resistivity between the at least two adjacent electrically conductive leads. In some preferred embodiments, the tabs are at least partly covered with a dielectric material to prevent tabs and/or the lead from leads shorting.

As described above, at least one, preferably both of: the first carrier 3 including the at least two adjacent electrically conductive leads 2, and the second carrier 5 including the electrically resistive layer 4 (shunting layer), is stretchable. Providing the pressure sensor 1 with at least one stretchable carrier including the electronically conductive leads, respectively the resistive layer, may improve the long term reliability of the sensor. Providing the sensor with stretchable components may further improve the reproducibility of pressure measurements. By providing: a stretchable first carrier 3 including the at least two adjacent electrically conductive leads 2, a stretchable second carrier 5 including the electrically resistive layer 4, and a stretchable spacer, these advantages may be further improved.

As described above the height "h" of the pocket defines the distance across the gap. The width "w" of the pocket 8 is defined by the distance between opposing sidewall portions of the spacer 7. In preferred embodiments, the height "h" of the pocket, is preferably in a range between 0.5 and 200 microns, more preferably in a range between 5 and 50 microns. and the width is larger than 0.5 cm preferably 1-2 cm. By confining the gas within the pockets (provision of the gas flow restrictor) and/or optimizing the dimension of the pocket, e.g. by optimizing a thickness, shape, and/or dimension of the spacer sagging of the elastomeric carriers may be reduced and/or recovery after applied force may be improved.

Inventors further found that, for a given carrier stiffness, the gap height and/or pocket width can be used to tune a response regime. In comparison to short gaps, long gaps are more sensitive at relatively high forces as, upon application of the force, first a comparatively large distance needs to be overcome before the electrically resistive layer 4 shunts the leads 2. Further, more gas may be entrapped causing a higher counter pressure to the force applied. Sensors wherein the leads 2 are comparatively placed closer to the resistive layer are more sensitive in a smaller force regime. Similarly, sensors with a wide pocket are comparatively more sensitive in a low-force regime compared to sensors wherein the pocket is more narrow. In other words, long spanning distances, require less force F to contact opposing carriers than short spanning distances, which require more elongation per unit length of the carriers to close the gap.

Figure 2B:
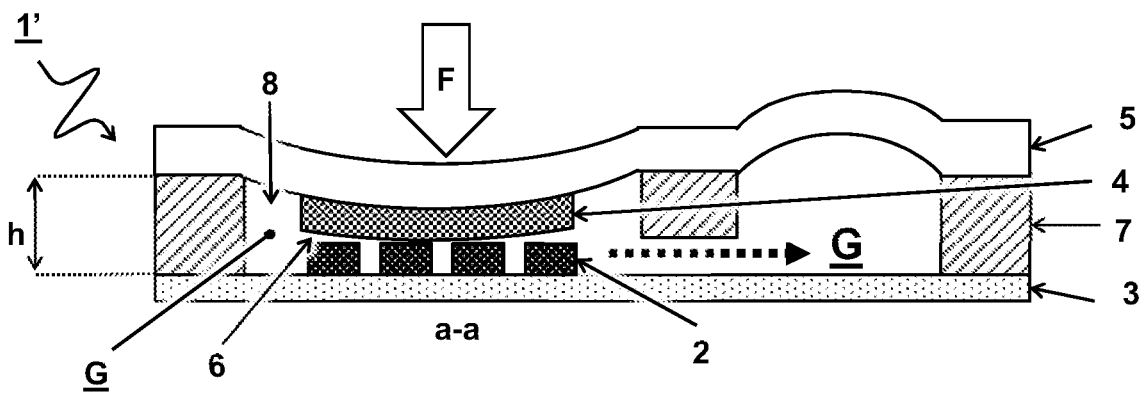

In some preferred embodiments, the spacer is a circumferential spacer that defines an aperture with a height 'h' and width 'w'. A circumferential spacer may be understood to have an inner perimeter, e.g. a ring/square shape. Optionally, as shown in FIG. 2A the pocket may be dimensioned larger than the width over which the electrically resistive layer 4 and the electrically conductive leads contact each other. Optionally or additionally, the pocket may comprise multiple interconnected compartments, e.g. as shown in FIG. 2B. The thus provided volume in the pocket allows gas G to be redistributed to reduce the counter force.

The spacer 7 depicted in FIG. 1A has an opening 7' in the side wall forming a flow restrictor. The flow restrictor comprises e.g., small openings, e.g. porosity including a natural porosity of the materials, e.g. carriers, as the flow restrictor impedes gas flow, e.g. so long as the gas remains in the pocket to at least counteract the applied pressure on a timescale wherein, in use, said pressure is applied (e.g. up to tens of seconds, e.g. 30 seconds). In other words, upon application of an external force, the pressure in the gas confining structure, even if provided with small openings, trails behind an equilibrium pressure. Without whishing to be bound by theory, inventors believe that the ability of the gas in the pocket to counteract the applied force and/or the ability to separate the carriers over the gap relates to an increase in a pressure of the gas in the pocket upon inward flexing of the carriers. In other words, upon decreasing the volume of the pocket an increased pressure in the pocket at least partly counteracts the decrease in volume.

In some preferred embodiments, one or more of the electrically conductive leads 2, the electrically resistive layer 4, and the first and second carrier 3,5 are elastically stretchable. Using elastically stretchable carriers, elastically stretchable conductive leads and/or an elastically stretchable layer 4 may, in use, contribute to counteract the exerted force and/or to redistribute the gas within the pocket structure. Use of elastically stretchable carriers may, in use, further contribute, upon release of force F, to restoring the shape of the carriers, e.g. aid in separating the carriers over the gap. Preferably, one or more of the electrically conductive leads 2, the electrically resistive layer 4, and the first and second carrier 3,5 have a Young's modulus in a range between 0.001 and 1 GPa, more preferably in a range between 0.01 and 0.2 GPa, e.g. about $10^2$ ($10^2$) MPa or $10^1$ ($10^1$) MPa.

In other or further preferred embodiments, one or more of the first carrier, second carrier, and spacer are formed of a composition comprising a thermoplastic polymer. Advantageously thermoplastic polymer materials may be fused together. For example, thermoplastic polymer sheets may be laminated together by applying pressure and heat. By using compositions comprising a thermoplastic polymer carriers and/or spacers may be fixated with respect to each other in a simple processing step under the influence of heat. As will be clarified in more detail later, use of compositions comprising a thermoplastic polymer simplifies the manufacturing of the pressure sensor 1. Use of compositions comprising a thermoplastic polymer may further reduce complexity in further manufacturing steps including the adhesion or integration of the sensor in further carriers, layers, and items such as textile sheets and textile products. In some preferred embodiments, one or more of the carriers may have a flexibility and stretchability similar to textile. The pressure sensor may be applied, e.g. adhered to a textile. Carriers having a composition comprising thermoplastic polyurethanes (TPU) were found to be suitable. In some embodiments, one or more of the carriers comprises TPU. In some embodiments, one or more of the carriers is a TPU layer, e.g. a TPU sheet. Some preferred embodiments use TPU substrates with a residual strain below <1% under normal usage. Suitable TPU substrates include but are not limited to TE-11C from DuPont and EU095 from Delstar. Contrary to prejudice, inventors surprisingly found that TPU based materials, e.g. TPU materials with low residual strain, can successfully be used as carrier for a pressure sensor. Further, products comprising TPU, e.g. textiles, may be comfortable, e.g. soft to the touch, for a user, e.g. wearer. Pressure sensors 1 formed with carriers comprising a thermoplastic polymer, e.g. TPU carriers, may further be water resistant. Further, pressure sensor with carriers comprising a thermoplastic polymer or textile products comprising such a sensor may be washable without loss of pressure sensing functionality. For example, inventors found that a pressure sensor according to the invention formed with a TPU carrier as described above was machine washable at 30° C. for up to 20 times without loss of pressure sensing functionality.

Figure 3A:
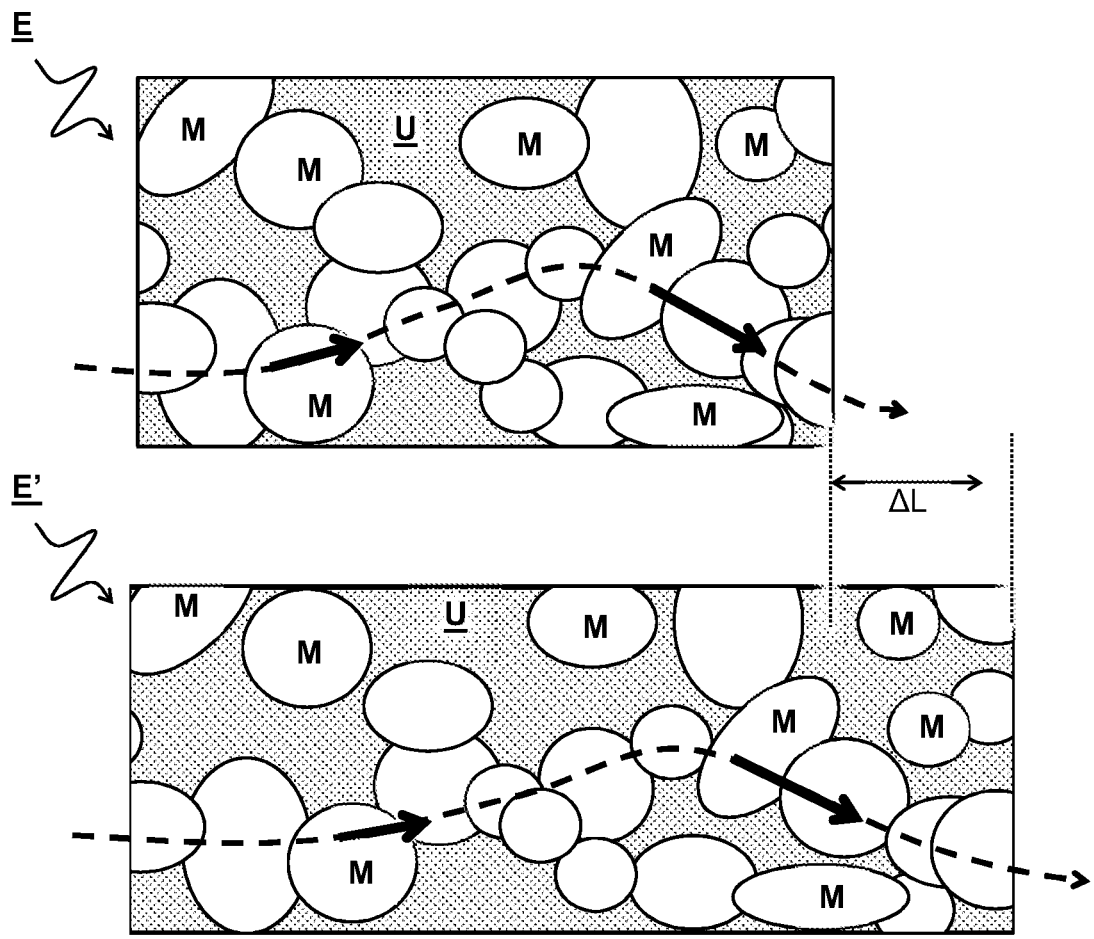
FIG. 3A schematically depicts cross-section side views of an electrical conduction pathway through a composite material in rest and when stretched.

FIG. 3A schematically depicts cross-section views of an electrical conduction pathway, indicated by dashed lines and arrows, through a composite material in an initial state E and when stretched E' over a length ΔL. The composite material E comprises an interconnected network of conductive micro-particles M in a polymer matrix U.

In a preferred embodiment of the pressure sensor 1, the composite material E in the electrically resistive layer 4 comprises an interconnected network of conductive micro-particles M in a polymer matrix U, preferably a thermoplastic polymer matrix, e.g. as shown in FIG. 3A. Conductive micro-particles M may be understood to include carbonaceous micro-particles as well as the other types of conductive particles listed before in the section describing a composition suitable for the conductive leads. Likewise, the composite material E for the electrically resistive layer 4 may comprise further additives including but not limited to conductive polymers and stabilizers. The volumetric ratio of the conductive micro-particles M with respect to the polymer matrix U is above a percolation threshold of the conductive micro-particles M. In this way an electrically conductive pathway may be formed throughout the thermoplastic polymer matrix U that has a length on the order of a size of the electrically resistive layer 4. In other words, the size and amount of the conductive micro-particles is chosen such that the composite material E is electrically conductive.

Figure 3B:
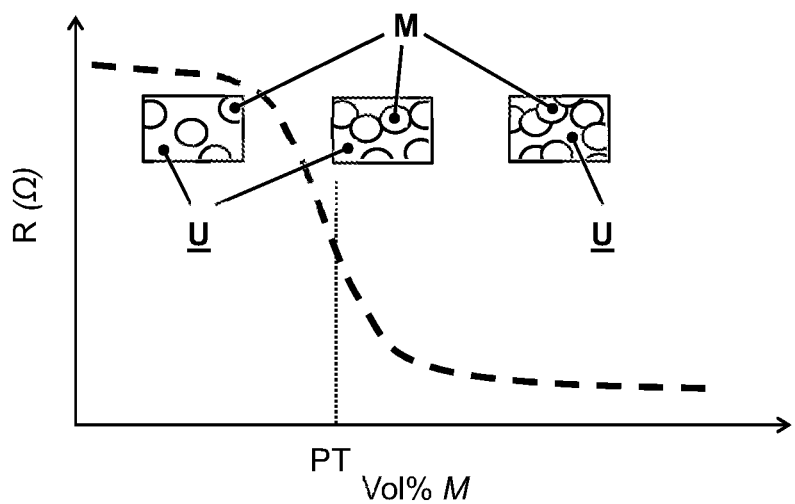
FIG. 3B schematically displays a percolation threshold for a composite material.

FIG. 3B schematically displays a percolation threshold PT for a composite material formed of a dispersion of conductive micro-particles M in a polymer matrix U. In the figure an electrical resistance R of the composite is plotted as a function of the volumetric amount of conductive micro-particles M of a given size. At low loadings, i.e. below the percolation threshold resistance is high. In this regime the conductive particles are believed to present in isolated clusters. The resistance is believed to be dominated by the properties of the matrix. At increasingly high loadings the resistance drops as the particles in the matrix start to form larger and larger clusters. At high loadings, where interconnected clusters of particles form a pathway throughout the matrix, the resistance levels off at a lower value.

Figure 9A:
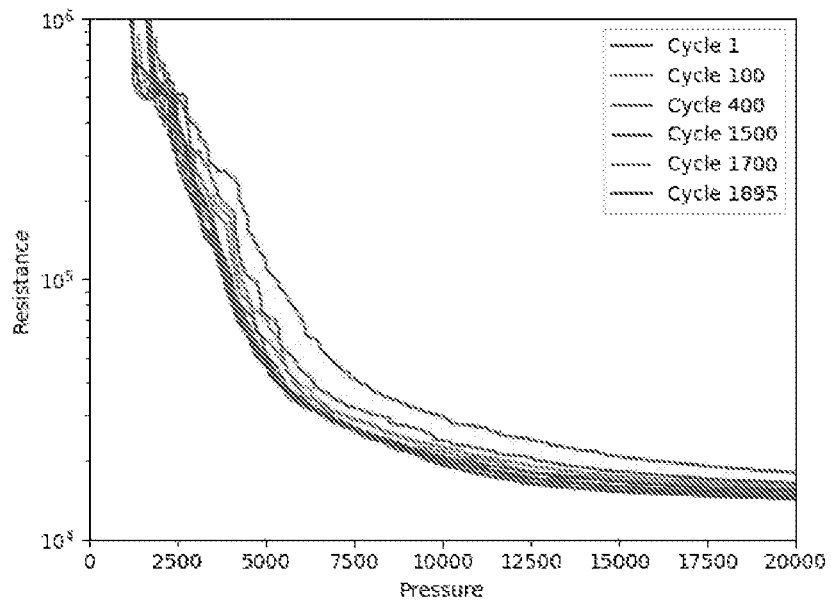
FIG. 9A depicts the measured resistance across the leads of an embodiment of a pressure sensor.

In some preferred embodiments, e.g. in embodiments wherein the carrier including the electrically resistive layer is defined to be stretchable up to 10%, preferably 20%, the volumetric ratio of the conductive micro-particles M with respect to the thermoplastic polymer matrix U is above a percolation threshold even when the composite material E is stretched. Advantages of using a composition that is above a percolation limit when stretched include that the electrical conductivity, e.g. of the electrically resistive layer, is not very dependent on strain (force/pressure) and uniform over the whole surface. Resistivity in pressure sensor is mainly dependent on force dependent contact area and contact resistance. The resistivity may advantageously be decoupled from the intrinsic resistivity of the materials comprised in the sensor (i.e. preferably use materials with force independent conductivity. Preferably, the electrically resistive layer 4 has a sheet resistivity in a range between 1 kΩ/cm$^2$ and 1 MΩ/cm$^2$, e.g. 5 kΩ/cm$^2$ or 200 kΩ/cm$^2$, preferably sheet resistivity in a range between 10 kΩ/cm$^2$ and 100 kΩ/cm$^2$, e.g. 20 or 50 kΩ/cm$^2$. In a preferred embodiment, a pressure sensor is provided, wherein the electrically resistive layer exhibits a sheet resistance in the range of 1 to 500 kΩ/cm$^2$, preferably in a range between 10 kΩ/cm$^2$ and 100 kΩ/cm$^2$, preferably about 30 kΩ/cm$^2$ Inventors found that providing a sheet resistivity within the described range, in use, facilitates efficient readout and/or improves accuracy of determining the resistance of the force dependent contact area A. Composites suitable to form a stretchable electrically resistive layer 4 include stretchable carbon pastes wherein the matrix comprises a urethane-based polymer and wherein the electrically conductive component comprises carbonaceous e.g. graphite-based particles. Examples such material include EMS CI-2051, Dupont PE671. The resistivity may be tuned, e.g. to a value within the specified range, by adding additional stretchable dielectric or encapsulant (e.g. Dupont PE773, EMS DI-7540). Inventors found that exemplary embodiments comprising a stretchable shunting layer (electrically resistive layer) were able to reliably and reproducibly measure a repeatedly applied pressure for over 2000 times over a period of 14 days. reference is made to FIG. 9A depicting experimental evidence. Surprisingly, the hysteresis (difference between contact area during application and during release of the external force) did not seem to worsen.

Figure 4A:
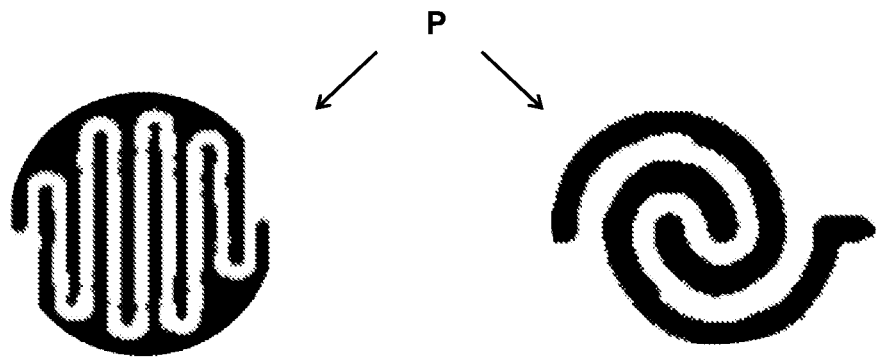
FIGS. 4A and B schematically display embodiments of parallel and spiraling interdigitated electrode designs.
Figure 4B:
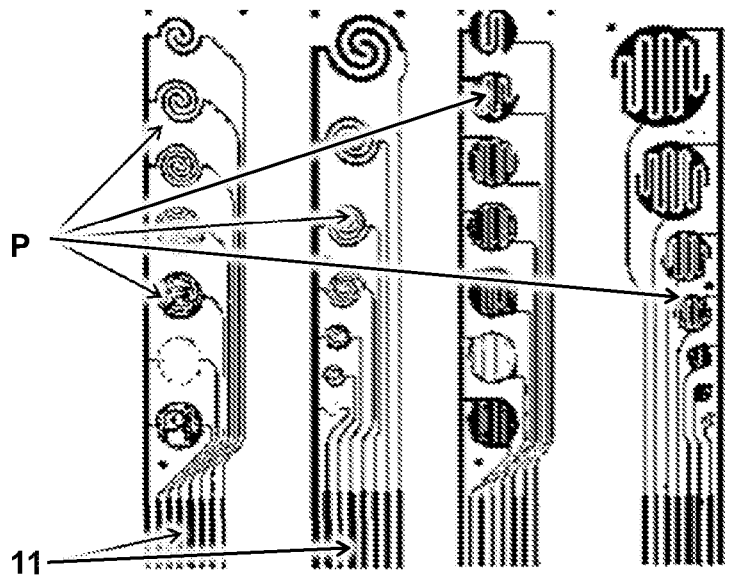
FIG. 4C schematically depicts an evolution of a force dependent contact area for an embodiment of a parallel and spiraling electrode design.
Figure 4C:
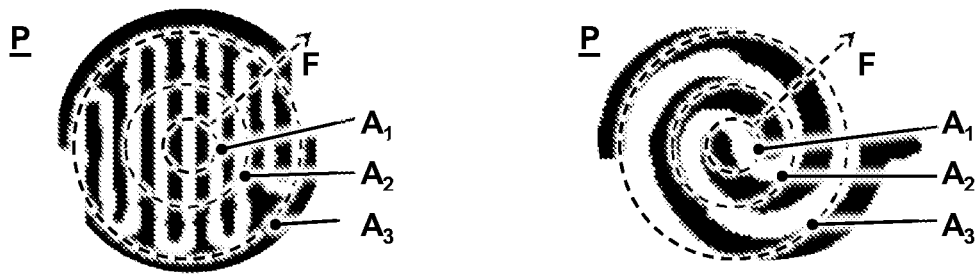
Figure 5A:
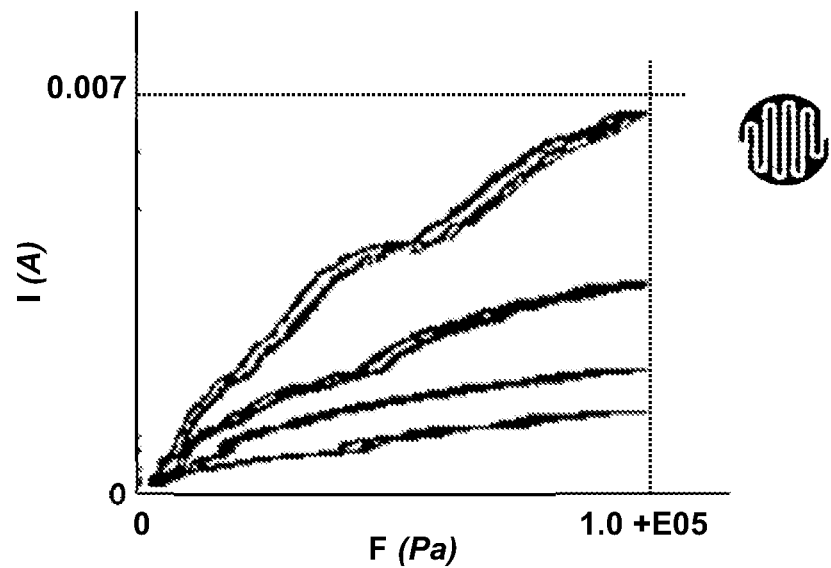
FIGS. 5A and B display recorded force-current traces for embodiments of pressure sensors with parallel and spiraling electrode designs.

FIG. 4A schematically display embodiments of patterns P for two adjacent electrically conductive leads 2. On the left the pattern is laid out in a parallel interdigitated electrode geometry. On the right in a spiraling electrode geometry. FIG. 4B displays exemplary embodiments of patterns P for parallel interdigitated electrode geometries and spiraling electrode geometries with various dimension, electrode width and spacing, including wires and tabs 11 for connecting to readout means. FIG. 4C schematically depicts an evolution of a force F dependent contact area A for embodiments of patterns P of similar dimension for a parallel and spiraling electrode design. FIGS. 5A and B display recorded force-current traces for embodiments of pressure sensors with parallel and spiraling electrode designs for a number of different dimensions.

WO2018189516 discloses a shunt type to pressure sensor that uses a parallel interdigitated finger electrode design. In such electrodes (e.g. as in FIG. 4A left) a multitude of electrically conductive strips extend from a common electrode to form a first electrode comprising an array of parallel fingers. Fingers of a second electrode extend in between the fingers of the first electrode.

Preferably, the pattern P of the pressure sensor according to the invention arranged to, upon closing of the gap, form a gradually increasing force dependent contact area between the at least two adjacent electrically conductive leads and the electrically resistive layer 4. A disadvantage of using a parallel interdigitated finger electrode design in shunt-type pressure sensors is that these typically suffer from a non-uniform force-resistance relation, e.g. comprising step-wise increases of contact area. Inventors believe this may be caused by a non-uniform evolution of the contact area A between the adjacent electrodes and a shunting layer. For clarification reference is made to FIG. 4C (left) which schematically depicts the evolution of the contact area as a function of applied force for an embodiment of a pressure sensor comprising a parallel interdigitated finger electrode design and a flexible electrically resistive layer to shunt the parallel electrodes. Upon application of a suitable force the electrically resistive layer (not shown) flexes towards the electrodes to form an initial contact (point) area marked by a dashed circle marked A1. Upon further stretching of the electrically resistive layer, e.g. by application an increasingly large force, the contact area increases. As the contact area gradually increases, e.g. from A1 via A2 to A3, the actual electrical contact area between the layers does not increase smoothly. Abrupt changes in contact area arise as additional fingers are added to the contact area. As the resistance between the at least two adjacent electrically conductive leads 2 scales with the area over which contact is made with the electrically resistive layer 4, this effect is reflected by a non-uniform force-resistance signal in the sensor. FIG. 5A displays recorded force-current traces for embodiments of pressure sensors with interdigitated parallel electrodes of varying dimensions. As can be seen from the curves, sensors using a interdigitated parallel electrodes display step-wise responses at certain forces.

Providing the at least two adjacent electrically conductive leads in a design which allows a gradual increase in the contact area with a shunting layer may mitigate such behavior, i.e. reduce the number and/or magnitude of these abrupt changes. Alternatively, this effect may be mitigated by decreasing the width of the fingers, i.e. using a higher number of finer and more closely spaced fingers. This however requires a resolution that may not be achievable with mass manufacturing methods. For example, an electrode design with a width of 5 mm a design that has 50 fingers and gaps with equal width requires a resolution that is not compatible with common printing techniques, like screen printing.

Figure 5B:
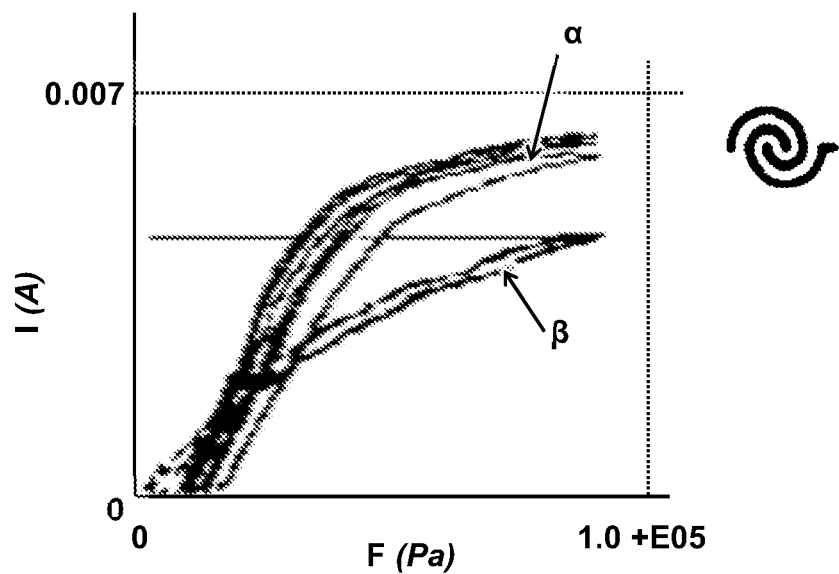

Inventors found that an electrode design in which the least two adjacent electrically conductive leads are arranged in a spiral pattern allows forming a gradually increasing contact area while remaining compatible with printing techniques. Inventors find that spirals, by design, are less prone to abrupt changes in the contact area as applied pressure increases. In the spiral two or more electrodes spiral around a central point at a constant distance from each other. Reference is made to FIG. 4C (right) which depicts two electrodes each revolving once around a central point before connecting to the wiring (not shown). As the contact area increases from A1 to A3 the area over which a shunting layer and the electrodes contact increases smoothly, e.g. upon increasing the force the number of electrodes in the contact areas remains constant. The number of revolutions of the electrode is the spiral in a given area, e.g. 5 mm, can be large. For example the number of revolutions may be in a range between 0.5 and 50 or even larger up to 100. However, such high resolution is not required, inventors found that patterns P having a small number revolutions work well and a while still being compatible with mass manufacturing methods as screen printing. Accordingly, the number of revolutions in the spiraling pattern is preferably in a range between 0.5 and 10, e.g. 8, more preferably in a range between 0.5 and 7, e.g. 5, most preferably in a range between 0.5 and 4, e.g. 1 or 2. FIG. 5B depicts recorded force-current traces for embodiments of pressure sensors with spiraling parallel electrodes in varying dimensions. As can be seen from the curve, sensors with spiraling electrodes show more smooth and continuous response as function of pressure as opposed to structures with the parallel interdigitated fingers of FIG. 5A.

As evidenced from FIG. 5B the dimension and geometry of the at least two adjacent electrically conductive leads (e.g. spirals) can be used to tune the sensitivity range of the sensor. For example, the top curves marked "a" show a high sensitivity, i.e. slope, in a first region with comparatively low force, followed by a second region at comparatively higher force with a lower sensitivity, curves marked "B" show a more uniform sensitivity over the depicted force range. By changing the pattern, sensors with different sensitivity and/or sensors which have maximum sensitivity in different force regimes can be made. Patterns may be varied to include one or more of: variations in the number of leads, variations in the width of leads, variations in the separation of the leads, variations in the length and variations in the geometry of the leads. For example, in spiraling patterns leads may be provided that have a width that tapers in an outward direction. In such way the maximum increase in the force dependent contact area may be tuned to higher forces.

Figure 6A:
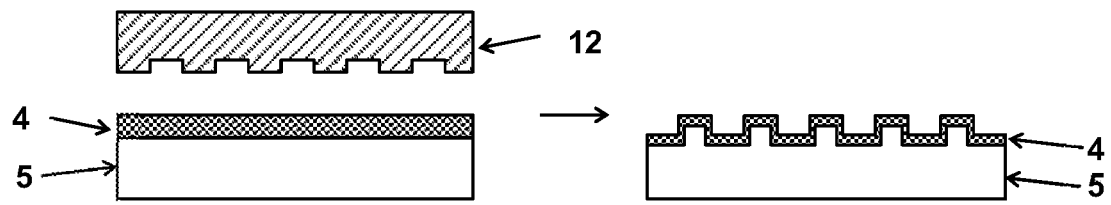
FIG. 6A schematically depicts embossing the electrically resistive layer.
Figure 6B:
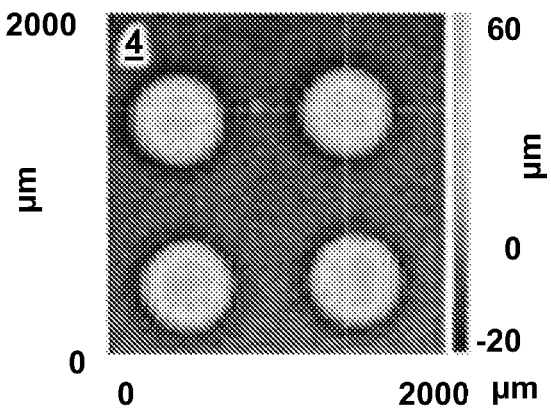
FIG. 6B depicts a micrograph of an embossed electrically resistive layer.
Figure 6C:
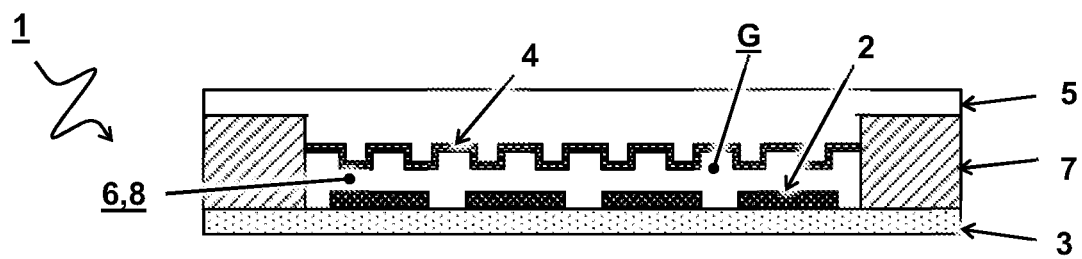
FIG. 6C schematically depicts a cross-section side view of an embodiment of a pressure sensor comprising an embossed electrically resistive layer.
Figure 6D:
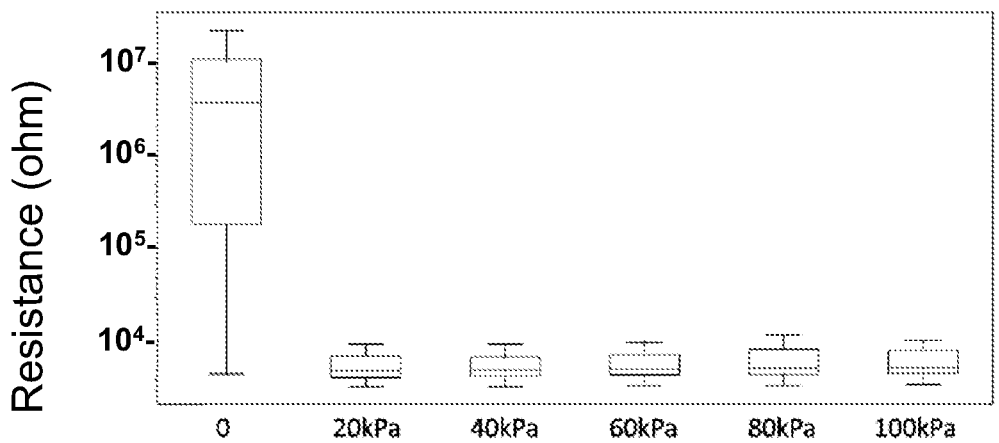
FIG. 6D depicts the measured resistance across the leads of an embodiment of a pressure sensor with embossed electrically resistive layer in dependence of applied force FIG. 7A schematically depicts a cross-section side view of an embodiment of a pressure sensing element.

In some embodiments, the present invention further relates to a pressure sensor wherein one or more of the at least two adjacent electrically conductive leads 2 and electrically resistive layer 4 is provided with a surface roughness comprising bumps and valleys. FIG. 6A schematically depicts an embossing step of the electrically resistive layer. In the step a carrier, e.g. second carrier 5, comprising a electrically resistive layer 4, is embossed with a mold 12. After embossing, a height relief is embossed in the electrically resistive layer 4. Optionally, the pattern may be embossed in the carrier 5 as well. Alternatively, the electrically resistive layer 4 may be provided onto a pre-embossed carrier. FIG. 6B depicts a micrograph of an embossed electrically resistive layer 4. FIG. 6C schematically depicts a cross-section side view of an embodiment of a pressure sensor 1. The embodiment, e.g. as shown, comprises: a first elastomeric carrier 3 including two adjacent electrically conductive leads 2 in a interdigitate finger pattern P; a second elastomeric carrier 5 including a FSR electrically resistive layer 4; the first and second carriers being separated by a spacer 7, defining an gap 6 and pocket structure 8 comprising a gas G. In another or further preferred embodiment of the pressure sensor 1, e.g. as shown in FIG. 6C, the electrically conducting layer 4 and/or the at least two adjacent electrically conductive leads 2 are provided with a relief pattern. Preferably the relief is provided with a height in a range between 1 and 50 µm, e.g. about 20 µm. An advantage of providing a height relief is that sensors may be formed that have an improved resolution and/or linearity at a low force regime. Inventors believe that the additional surface area in the electrically conducting layer 4 and/or electrically conductive leads 2 due to the protrusions contributes to the improved linearity in the pressure sensor. The contact area as well as contact resistance will be more strongly affected by the contact. In use, when surface portions of the at least two adjacent electrically conductive leads 2 and the electrically resistive layer 4 approach and contact under the influence of an externally applied force, gas might get trapped between the layers. This gas may hinder effective contact formation between the layers. The relief allows for gases to reside and flow within the valleys of the structures. Reference is made to FIGS. 6D, 11, and 12. FIG. 6D displaying a measured resistance between the lead of a pressure sensor 1 having an embossed electrically resistive layer 4. At low force recorded resistance between the leads is high. At higher forces, 20 kPa and up, the electrically resistive layer 4 shunts the leads and resistance drops to a stable lower value. As described in relation to FIG. 6A the relief may be provided by embossing or any other method suitable to provide such a relief, including 3D deposition methods and ablations methods.

FIGS. 11A-B schematically depict two types of pressure sensors. In the sensors of FIG. 11A the electrically resistive layer 4 is provided with a relief structure of bumps 4'. The sensors in FIG. 11B do not comprise a relief, but are otherwise identical. At zero external force the carriers 3 and 5 are separated across a gap 6 of pocket structure 8 defined between the carriers and side wall of a spacer 7. The pocket is filled with gas G. The spacer does not include any major gaps or openings in the sidewall but comprises a flow restrictor 7' in the form of micro pores. Similar as described earlier, the pocket defined between the carries and the sidewall of the spacer defines a gas confining structure that is filled with a gas that at least partly counteracts an exerted force that is exerted on the pressure sensor, Within the pocket the gas is initially free to redistribute. Flow to the outside of the pocket is restricted. As such this pocket, and pockets of all embodiments according to the invention, may be understood to comprise a gas flow restrictor. The gas flow restrictor impedes gas from exiting the pocket structure e.g., upon application of an external force. In the embodiment as shown, the electrically conducting layer 4 is provided with a micro patterned relief structure, e.g. bump 4'. It will be understood that the relief pattern may alternatively, or additionally be provided to the leads with the same effect. Likewise, it will be understood that the relief pattern may be suitable provided after deposition of the respective material, e.g. by embossing. Alternatively, or in addition the relief pattern can be provided, e.g. overprinted, on a pre-patterned carrier.

As applied force increases the separation (gap) between the carriers is progressively reduced. In this case approaching carriers are depicted in an oversimplified fashion which only relates to compression of the spacer 7. It will be understood, that similarly to other embodiments disclosed herein, flexing of the carriers can also contribute to reducing of the gap. As the carriers contact, the at least two adjacent electrically conductive leads are shunted by the electrically resistive layer. In this depicted embodiment current may flow between the leads via the tops of a relief pattern that is provided to the electrically resistive layer 4. As force increases, the contact area between the at least two adjacent electrically conductive leads 2 and the micro structures provided on the electrically resistive layer progressively increases, e.g. upon compression of the bumps 4' and/or of electrically resistive layer 4. As such, the contact area (which as explained directly relates the to the sensor response) depends on both the number of bumps contacting the leads as well as on the contact area of each such bump with the leads. As both depend on pressure the pressure sensor of the claimed type were found to display improved performance, e.g. benefitting from improved linearity and widened response window.

Impeding (hindering) the gas to leave the pocket was found to contribute to restoring the carriers of the sensor to an initial separated starting position as the external pressure is reduced or removed altogether. Providing the gas flow restrictor mitigates redistribution of a gas from a pocket of a first sensor towards the environment (ambient) and/or to a pocket of a pocket of an adjacent second pressure sensor. Thus cross-coupling between adjacent sensors can be mitigated. Providing the gas flow restrictor mitigates is further found to mitigate hysteresis within a given sensor, e.g. hysteresis as a result of an incomplete recovery of a sensor from a preceding pressure measurement (see in this respect also FIG. 9A and the description thereof).

Provision of the micro structured relief was found to improve gas distribution within the pocket. Redistribution of gas flow within the pocket is believed to provide increased linearity of the sensor response, in particular at a low force regime. The provided gas flow restrictor may be understood as an overpressure valve allowing controlled release of excessive pressure, e.g. via micro pores. For sensors without microstructured relief pattern the beneficial effect due to progressive increase in contact area between bumps and leads is essentially absent (see FIG. 11B).

Figure 12A:
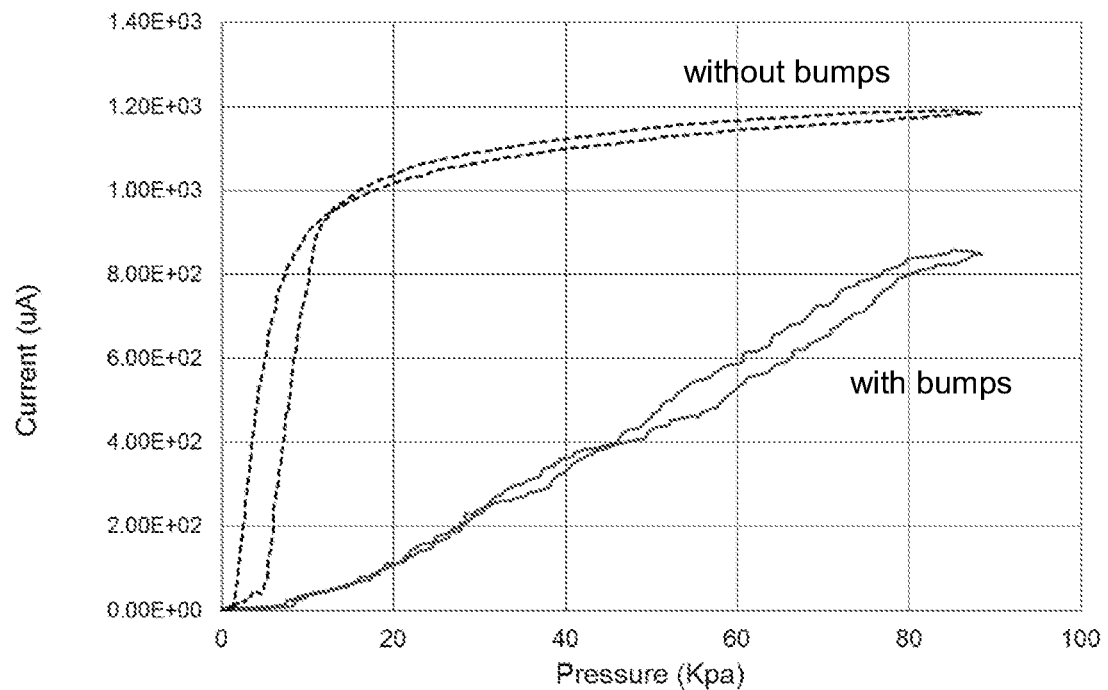
FIGS. 12A and B compare pressure sensor responses of a number of embodiments of pressure sensors.

The inventors experimentally confirmed improved linearity of the sensor response as demonstrated in FIG. 12A. For this experiment two types of sensors were manufactured. In the first type, the electrically resistive layer 4 is not provided with a microstructures relief pattern (dashed line). The second type of sensors (continuous line) is identical to the first type except for that the electrically resistive layer is provided with a relief pattern of bumps. As can be seen from the recorded current between leads as a function of applied pressure, sensors with bumps were found to have improved linearity. Pressure distribution within the pocket structure (by provision of the relief pattern) is believed to further contribute to improving sensor response and/or linearity. In sensors without relief structure, e.g. bumps, gas may get trapped, e.g. in spaces between adjacent leads and the approaching electrically resistive layer. A build up of pressure in such spaces is believed to hinder further approach opposing carriers limiting sensor performance, e.g. limiting the effective response window and/or limiting sensor linearity. Furthermore, excess pressure of gas trapped in such spaces cannot be released, e.g. via the gas flow restrictor, resulting in a built of pressure which may potentially lead to hysteresis effects and/or even to permanent damage to the sensor. Provision of a relief pattern is believed to improve gas redistribution within pocket as opposing carriers approach, allowing gas to flow and reside within the valleys between the microstructured bumps while allowing enabling partial shunt of adjacent leads within the tops of the bumps. It will be understood that shape, dimension, and/or spacing of the bumps will be dependent on shape, dimension, and/or spacing of the adjacent electrically conductive leads. Preferentially, the relief pattern is provided in a pattern that mismatches the pattern P of the leads. Preferably the bumps are dimensioned such that, upon contact with the leads, at least two bumps (one valley) is present over the lead allowing gas to flow (redistribute) across a lead.

Figure 12B:
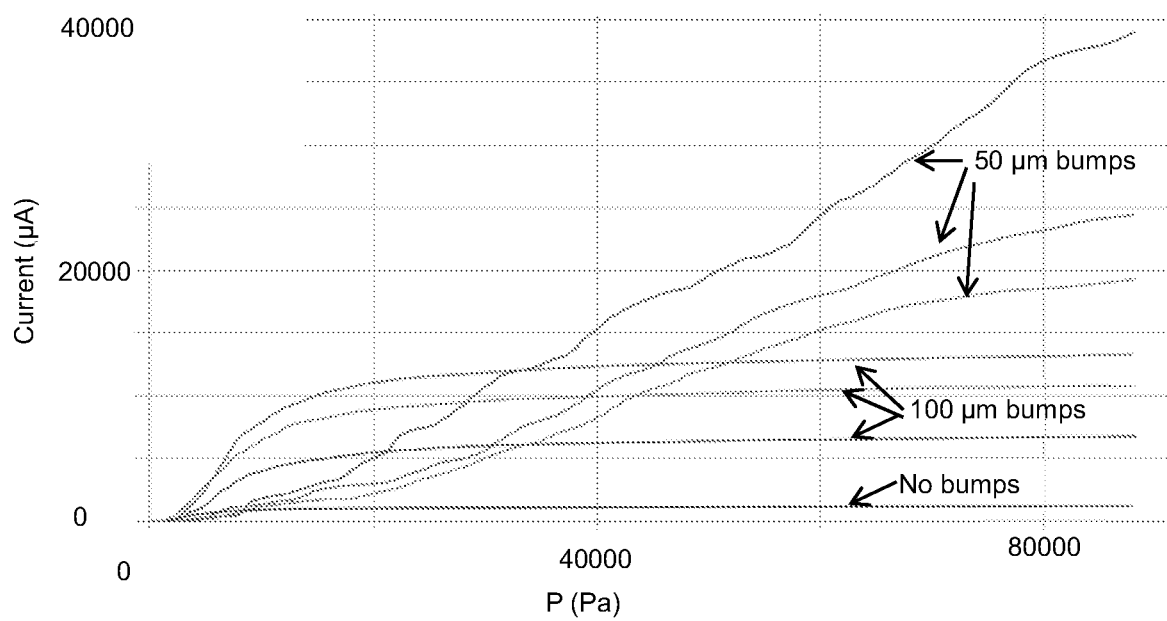

FIG. 12B depicts experimentally recorded sensor response curves (current as function of applied pressure) for three types of sensors. All sensors are identical except for the provision and dimensioning of the relief pattern. In a first type of sensors (marked 'no bumps') the electrically resistive layer mere comprises naturally occurring surface roughness, i.e. is not provided with an express relief structure. The sensor response was found to level off after initial comparatively small response at low pressures. The comparatively low absolute response value is believed to be caused by non-uniform pressure distribution of gas within the pockets structure, e.g. pressure built-up of gas residing between adjacent leads hindering further contact between the leads and the electrically resistive layer, thus hindering build up of a progressively increasing contact area between the electrically resistive layer and the leads. For sensors that are provided with bumps having a dimension (width) of 50 µm a linear response was observed over a larger pressure window. Sensors having wider bumps of 100 µm were found to display an intermediate behavior, which is believed to be related to the relative dimensioning and spacing of the leads and bumps, allowing the comparatively large bumps to be less effective in allowing gas to redistributing throughout the pocket, e.g. not preventing gas from being partially confined between the adjacent leads comprised in this particular sensor.

Figure 7A:
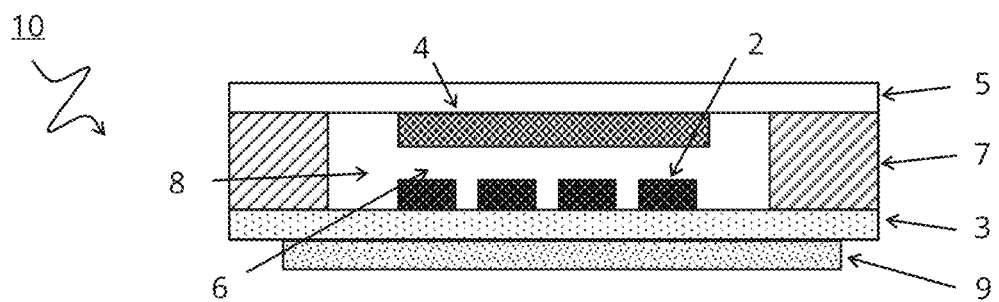
FIG. 7B schematically depicts a perspective view of an embodiment of a pressure sensing textile sheet.
FIG. 7C displays a photograph of a pressure sensing textile sheet comprising an array of pressure sensors.
Figure 7B:
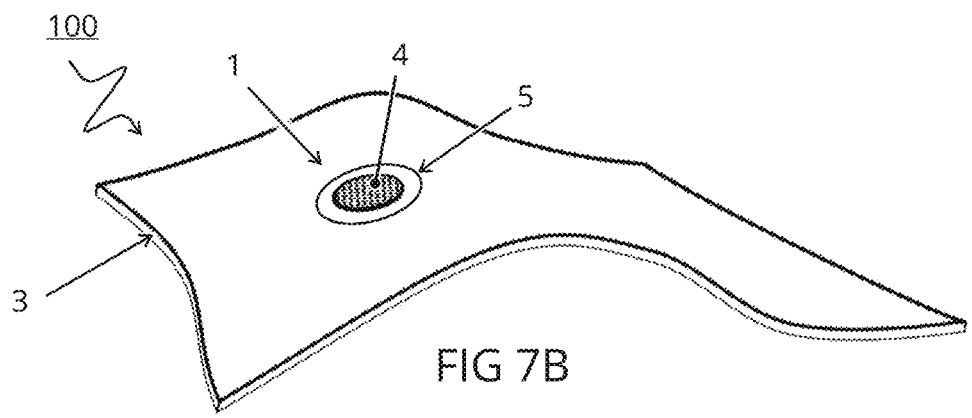

According to a further aspect, the invention relates to a pressure sensing element. FIG. 7A schematically depicts a cross-section side view of an embodiment of a pressure sensing element 10. In some embodiments, e.g. as shown, an adhesive layer 9, e.g. a hot melt adhesive, is provided to a face of the pressure sensor 1. The adhesive layer may be suited to adhere the pressure sensor 1 to a further product, e.g. a flooring part or a textile product. Alternatively, the pressure sensing element 10 may be suited for application to an area of skin of a person and/or animal. It will be appreciated that for such applications the adhesive layer 9 is preferably a skin compatible pressure sensitive adhesive.

Figure 7C:
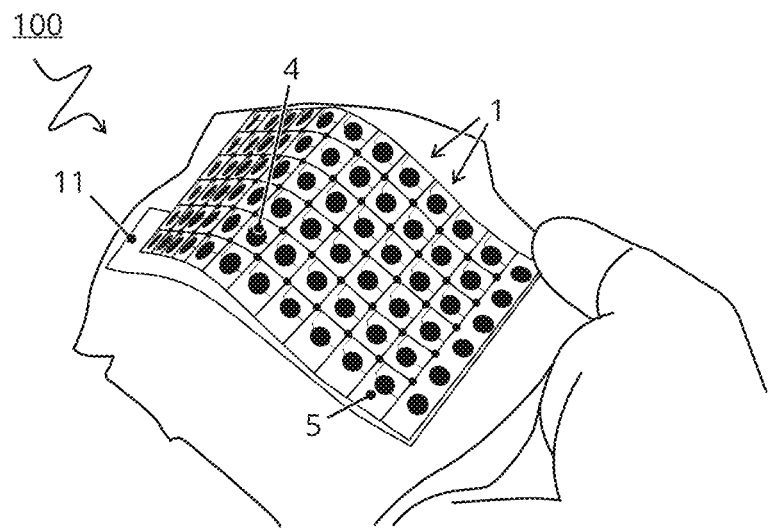
Figure 9B:
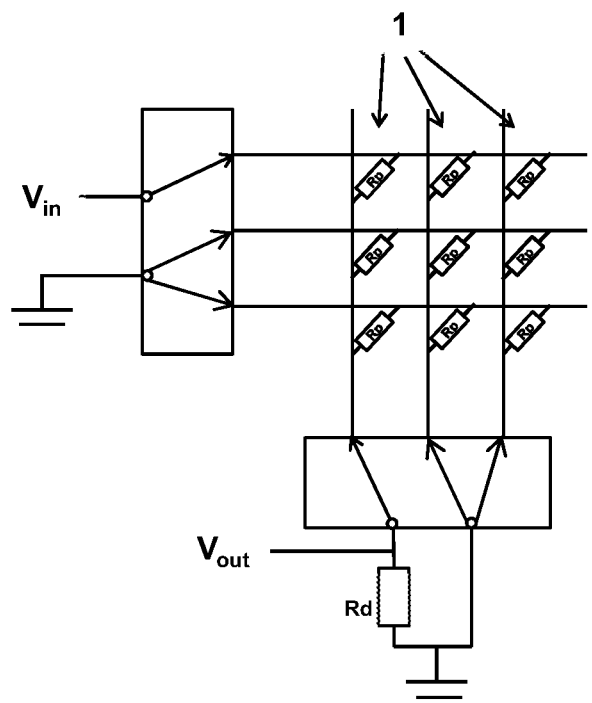
FIG. 9B schematically illustrates an electrical scheme for an array of pressure sensors in a passive matrix configuration.
Figure 10:
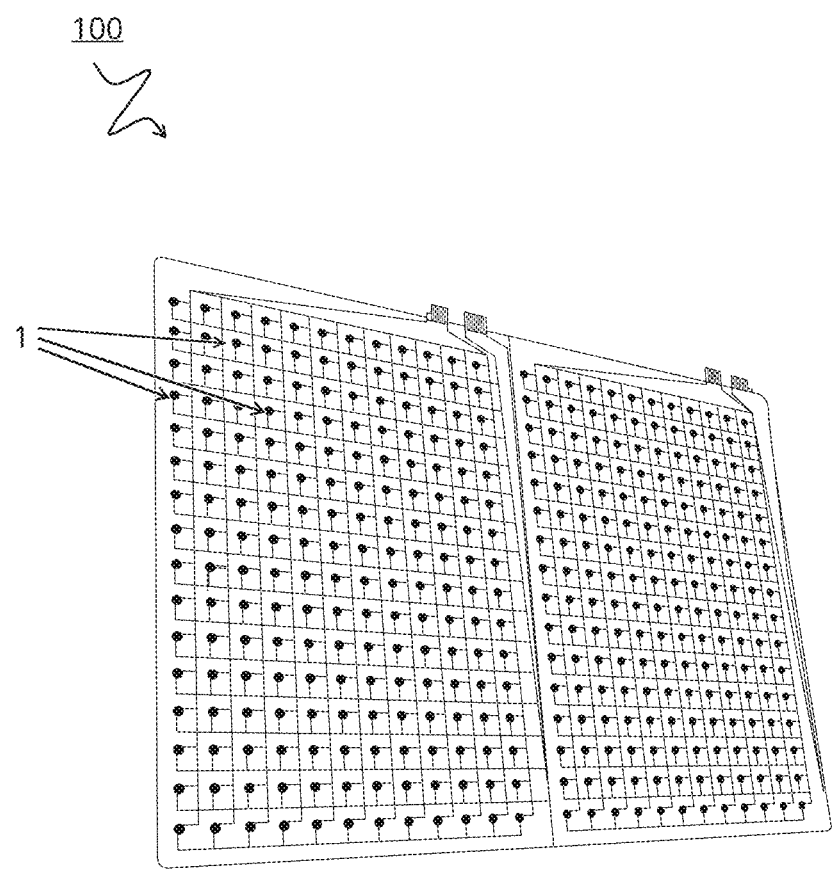
FIG. 10 displays a photograph of a pressure distributions sensing product comprising an array of pressure sensors in a passive matrix configuration.

According to yet a further aspect, the invention relates to a pressure sensing sheet laminated onto textile 100. FIG. 6B schematically depicts a perspective view of an embodiment of a pressure sensing sheet laminated onto textile 100. In some embodiments, the pressure sensor may be adhered, e.g. glued to a textile sheet. Preferably, adhesion to the textile is attained with a thermoplastic polymer. By using a thermoplastic adhesive the sensor may be fused, e.g. laminated to the textile sheet. Such adhesive is commonly pre-applied on the TPU film such as the TE-11C film from Dupont or ST604 from Bemis. FIG. 7C displays a photograph of a pressure sensing sheet laminated onto textile (pressure sensing textile sheet) comprising an array of pressure sensors 1. In the embodiment as shown, the textile forms a carrier onto which a pressure sensing sheet comprising a electrically resistive layer 4 is laminated. The tabs 11 for connecting to a read-out device are provided at a peripheral location. In a preferred embodiment, e.g. as shown in FIG. 7C, the pressure sensing textile sheet 100 comprises a plurality, preferably an array, of pressure sensors. Use of an a plurality, e.g. an array, enables a user the measure a pressure distribution exerted onto the sheet. Fox example, a pressure distribution resulting form an item placed onto a surface of the textile sheet. Providing a 2D array of spaced sensors allows correlating a force or pressure to a spatial location on the textile sheet. In some embodiments, e.g. as shown with reference to FIGS. 9B and 10, the sensors 1 are configured in a passive matrix configuration. A pressure sensing textile sheet 100 comprising an array of spaced out pressure sensors, e.g. in a passive matrix configuration, may be used to identify a shape and/or a size of an item placed on the textile sheet. In some embodiments, the sensors in the 2D array are spaced at a distance ranging between 0.1 and 10 cm, preferably between 0.5 and 5 cm, e.g. 1 or 2 cm.

In other or further embodiments, the pressure sensors 1 in the pressure sensing textile sheet 100 are differently dimensioned. Arrays comprising differently dimensioned sensors may sense forces over a larger force sensing regime than a single pressure sensor. Pressure sensing textile sheets 100 having differently dimensioned pressure sensor 1 may allow measuring forces over a broad pressure range. Accordingly, pressure sensing textile sheets 100 may be used to identify an item, e.g. the weight of an item, or of a body part of a person, paced on the textile sheet. Differently dimensioned sensors may have different sensitivity ranges as explained hereinabove. Differently dimensioned sensors may be understood to include one or more: different pocket dimension, e.g. width, differently provided relief height, and different design of at least two adjacent electrically conductive leads including electrode width, spacing, and spacing between adjacent electrode. Advantageously, listed variations may be easily integrated into the manufacturing methods described herein below. Optionally, the array may comprise sensors with a different height of the pocket, i.e. different distance across the gap.

FIG. 8A schematically depicts a perspective view of an embodiment of a matrass 1000 comprising an array of pressure sensors. According to yet a further aspect, the invention the relates to products comprising the pressure sensor 1 and/or products comprising the pressure sensing textile sheet 100. In one embodiment, the pressure distribution sensing product 1000 comprises the pressure sensing textile sheet 100. Preferably, the product 1000 comprises the pressure sensing textile sheet with differently dimensioned sensors. For example, the product may be a matrass covered with a pressure sensing sheet (100) having an array of pressure sensor (1). Such matrass may be used to detect the presence of a person on the matrass. Further such matrass may be used to detect the position and/or orientation of the person on the matrass, e.g. sitting or lying down, and/or orientation, e.g. during lying. For example, the matrass may be provided with an array having a first set of sensors dimensioned to detect the presence of an object, e.g. a person, lying on the matrass, and a second set of sensor dimensioned to sense small variations, e.g. fluctuations, in the forces exerted onto the matrass by the person, for example sensing a heart beat or respiratory motion of a person on the product. It will be appreciated that the invention also relates to other products benefitting from the integration with a pressure sensor as described herein. These products include but are not limited to: bedding sheets and blankets; clothing items, e.g. sports wear; jewelry, e.g. wrist watch straps; furniture and upholstery, e.g. seats, car seats and cushions; and flooring, e.g. carpets.

According to yet a further aspect, the invention the relates to a method for manufacturing a pressure sensor, preferably the pressure sensor as described herein above. In one embodiment, e.g. as shown in FIG. 8B, the method comprises: providing 21 a first carrier 3; providing 22 a second carrier; providing 23 at least two adjacent electrically conductive leads 2 in a pattern P on a face of the first carrier 3; depositing 24 a composite material E on a face of the second carrier 5 to form an electrically resistive layer 4 for shunting the at least two adjacent electrically conductive leads 2; providing 25 a spacer 7; and stacking the first and second carriers 3,5 across the spacer 7 such that the at least two adjacent electrically conductive leads 2 face the electrically resistive layer 4 across a gap 6 defined by the spacer 7. Stacking may comprise gluing. As described above in relation to the sensor, the first carrier 3 including the at least two adjacent electrically conductive leads 2 and/or the second carrier 5 including the electrically resistive layer 4 are stretchable such as to upon receiving a force F, exerted in a direction across the gap 6, reduce the gap 6 between the electrically resistive layer 4 and the at least two adjacent electrically conductive leads 2 to shunt the at least two adjacent electrically conductive leads 2 over a force dependent contact area A. The gap 6 is formed by a pocket 8 between the carriers and is filled with a gas. The pocket defines a gas confining structure between the carriers that is filled with a gas that at least partly counteracts the exerted force F. It will be appreciated that the method is not be construed to be limited to order of steps described. For example, the spacer 7 may be provided to one of the carriers before providing the electrically conductive leads 2, respectively the electrically resistive layer 4.

The electrically conductive materials including the leads and the layer 5 may by provided by any method suitable of providing the layers in according the specifications described above. In one embodiment, the leads and/or the electrically resistive layer 4 may be provided by known microfabrication tools including but not limited to lithographic methods. Preferably, the leads and/or the electrically resistive layer as well as the spacer are provided by local deposition methods. Optionally, the spacer may be provided as a separate pre-formed item, e.g. a washer. Preferably, the spacer may provided using similar local deposition tools as the leads and/or the electrically resistive layer. Alternatively, the spacer 7 may be provided by embossing a pattern in the first and/or second carrier.

It will be appreciated that, as described above in relation to the sensor, the electrically conductive leads are formed of a composition comprising an electrically conductive material. It will be further appreciated that the electrically conductive leads 2 and/or the electrically resistive layer 4 may be formed from a mixture of such material and a solvent, e.g. an ink "I" which can be a stretchable conductive ink such as dupont PE873, EMS CI-1036. The ink may be selected to upon removal of the solvent, form an electrically conductive composition as described.

In a preferred embodiment providing the at least two adjacent electrically conductive leads (2), and/or providing the composite material (E), and/or providing the spacer comprises printing, preferably screen printing, rotary screen printing, gravure printing, offset printing, LIFT printing or inkjet printing. Advantageously, printing methods improve scalability of the method allowing mass manufacturing at a low cost. For example, the plurality of adjacent electrically conductive leads may be provided by a single printing step, even with mutually varying dimensions or designs, and/or over large areas of a carrier. hereby multiple sensors or sensors, e.g. textile sheets comprising an array of sensor can be made in one process. Additionally the layers may be printed in a roll to roll manner further lowering the costs.

In another or further preferred embodiment wherein one or more, preferably all, of the first and second carriers 3,5, and the spacer 7 is formed of a composition comprising a thermoplastic polymer, stacking comprises laminating. Laminating comprises arranging the components and layers in a stack as described herein, followed by heating the stack to a temperature to a melting temperature of the thermoplastic polymer. Typically, a force is applied during heating to ensure contact between the components in the stack. Fusing the carriers and/or spacer may obviate a need for separate gluing steps, e.g. to affix the spacer. Fusing the layers may further reduced the number of alignment steps, e.g. alignments steps between consecutive gluing steps. Advantageously, the laminating setup is arranged to include the gas into the pocket. Laminating methods to form a gas filled pockets include, but are not limited to, the use of a stiff pressure plate such that the flexible carriers are not flexed into volume enclosed by the spacer or using stiffer liner foil on which the elastomer resides on. Alternatively, a pressure plate may be used that is provided with openings having a dimension and a location such that during laminating the pressure plate does not exert pressure onto the stack at locations corresponding to the volume enclosed by the spacer (pocket). The lamination may be performed using a heated membrane press type laminator, hot press laminator or roll laminator. Advantageously the pocket structure with gas flow restrictor also maintains a separation distance between the opposing carriers during the manufacturing process, thus allowing use of high throughput and/or or low cost manufacturing methods such as lamination.

In another or further embodiment, the method for manufacturing a pressure sensor further comprises providing, e.g. embossing the electrically conducting layer 4 with a relief pattern or overprinting the electrically conducting layer on a carrier bearing a relief pattern, e.g. a pre-printed or pre-embossed relief pattern.

In some embodiments, the method for manufacturing a pressure sensor further comprises providing, preferably printing, a pressure sensitive adhesive (PSA) composition to an outward surface of the sensor.

According to yet a further aspect, the present invention relates to a method for manufacturing a pressure sensing textile sheet 100. In particular, a pressure sensing textile sheet 100 comprising a pressure sensor 1 as described herein. Said method comprises: the steps for manufacturing a pressure sensor 1 as described herein above, and providing a fabric (textile) sheet. Optionally, the pressure sensor 1 may be glued to the fabric (textile) sheet. Preferably, the fabric sheet is formed of a composition comprising a thermoplastic polymer, e.g. a thermoplastic polyurethane polymer as described above. Textile (fabric) sheets formed of a composition comprising a thermoplastic polymer may be used in the described lamination process. Accordingly, the pressure sensor 1 may be laminated to the textile sheet.

For the purpose of clarity and a concise description, features are described herein as part of the same or separate embodiments, however, it will be appreciated that the scope of the invention may include embodiments having combinations of all or some of the features described. For example, while embodiments were shown for circumferential spacers, also alternative ways may be envisaged by those skilled in the art having the benefit of the present disclosure for achieving a similar function and result. The various elements of the embodiments as discussed and shown offer certain advantages, such as reliability, compatibility with textiles, and compatibility with mass manufacturing method. Of course, it is to be appreciated that any one of the above embodiments or processes may be combined with one or more other embodiments or processes to provide even further improvements in finding and matching designs and advantages. It is appreciated that this disclosure offers particular advantages to pressure sensing textiles, and in general can be applied for any application with integrated pressure sensors in a flexible substrate.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A pressure sensor laminated onto a textile sheet to form a pressure sensing textile sheet, the pressure sensor comprising:
   at least two adjacent electrically conductive leads disposed in a pattern on a face of a first elastomeric carrier; and
   an electrically resistive layer formed of a resistive composite material for shunting the at least two adjacent electrically conductive leads, said electrically resistive layer disposed on a face of a second elastomeric carrier;
   wherein the first elastomeric carrier and the second elastomeric carrier are stacked across a spacer such that the at least two adjacent electrically conductive leads face the electrically resistive layer across a gap defined by the spacer to form a pocket structure defining a gas confining structure that is filled with a gas that at least partly counters a force exerted on the pressure sensor,
   wherein the first carrier including the at least two adjacent electrically conductive leads and the second carrier including the electrically resistive layer are stretchable so as to, upon receiving the force exerted in a direction across the gap, reduce the gap between the electrically resistive layer and the at least two adjacent electrically conductive leads to shunt the at least two adjacent electrically conductive leads with the resistive composite material over a contact area in dependence on the force to result in a pressure dependent electrical resistance between the conductive leads, and
   wherein the pocket structure is provided with a relief structure of micro bumps and an opening to reduce the counter force of the gas, said opening being dimensioned to impede the gas from exiting the pocket.

2. The pressure sensor according to claim 1, wherein the opening is formed in the spacer.

3. The pressure sensor according to claim 1, wherein the pocket structure has a height, between the carriers, in a range between 0.5 and 500 micrometer and a width in a range between 0.5 and 2 cm.

4. The pressure sensor according to claim 1, wherein the first carrier, the second carrier, and the spacer are formed of a composition comprising an elastomeric material having an elastic modulus below about 100 MPa.

5. The pressure sensor according to claim 1, wherein the electrically resistive composite material comprises an interconnected network of conductive micro-particles in an elastomeric polymer matrix.

6. The pressure sensor according to claim 1, wherein the pattern is arranged to, upon closing of the gap, form a gradually, and in a radial direction, increasing contact area between the electrically resistive layer and the at least two adjacent electrically conductive leads.

7. The pressure sensor according claim 1, wherein the pocket comprises a plurality of connected compartments to redistribute the gas upon application of the force.

8. The pressure sensor according to claim 1, wherein the electrically resistive layer exhibits a sheet resistance in a range of 1 kiloOhms/cm$^2$ to 500 kiloOhms/cm$^2$.

9. The pressure sensor according to claim 1 comprising:
   a plurality of spatially separated ones of the at least two adjacent electrically conductive leads disposed in a pattern on the face of the first elastomeric carrier; and
   a plurality of spatially separated corresponding ones of the electrically resistive layers on the face of the second elastomeric carrier to form a plurality of pocket structures, each defining a gas confining structure that is filled with a gas.

10. The pressure sensor according to claim 9 wherein at least a first part of the plurality of pockets is dimensioned and/or shaped in accordance with a first sensitivity range, and
    wherein a second part of the plurality of pressure sensors is dimensioned and/or shaped in accordance with a second sensitivity range, different from the first, so as to extend an overall sensitivity range of the pressure sensor.

11. A pressure distribution sensing product comprising a plurality of pressure sensors, wherein the plurality of pressure sensors are arranged in a configuration for detecting pressure over an area according to placement of the plurality of pressure sensors, wherein each of the plurality of pressures sensors is:
    a pressure sensor laminated onto a textile sheet to form a pressure sensing textile sheet, the pressure sensor comprising:
    at least two adjacent electrically conductive leads disposed in a pattern on a face of a first elastomeric carrier; and
    an electrically resistive layer formed of a resistive composite material for shunting the at least two adjacent electrically conductive leads, said electrically resistive layer disposed on a face of a second elastomeric carrier;
    wherein the first elastomeric carrier and the second elastomeric carrier are stacked across a spacer such that the at least two adjacent electrically conductive leads face the electrically resistive layer across a gap defined by the spacer to form a pocket structure defining a gas confining structure that is filled with a gas that at least partly counters a force exerted on the pressure sensor, wherein the first carrier including the at least two adjacent electrically conductive leads and the second carrier including the electrically resistive layer are stretchable so as to, upon receiving the force exerted in a direction across the gap, reduce the gap between the electrically resistive layer and the at least two adjacent electrically conductive leads to shunt the at least two adjacent electrically conductive leads with the resistive composite material over a contact area in dependence on the force to result in a pressure dependent electrical resistance between the conductive leads, and wherein the pocket structure is provided with a relief structure of micro bumps and an opening to reduce the counter force of the gas, said opening being dimensioned to impede the gas from exiting the pocket.

12. A method for manufacturing a pressure sensor on a pressure sensing textile sheet, the method comprising:

providing a first elastomeric carrier;

providing a second elastomeric carrier;

laminating a fabric sheet to the first carrier and/or the second carrier; and providing at least two adjacent electrically conductive leads in a pattern on a face of the first carrier;

depositing an electrically resistive composite material on a face of the second carrier to form an electrically resistive layer for shunting the at least two adjacent electrically conductive leads; providing a spacer;

providing a relief of micro structured bumps;

stacking the first and second elastomeric carriers across the spacer such that the at least two adjacent electrically conductive leads face the electrically resistive layer across a gap defined by the spacer to form a pocket structure including a gas flow restrictor, the pocket structure defining a gas confining structure that is filled with a gas that at least partly counteracts a force exerted on the pressure sensor and wherein the first carrier including the at least two adjacent electrically conductive leads and the second carrier including the electrically resistive layer are stretchable so as to, upon receiving the force exerted in a direction across the gap, reduce the gap between the electrically resistive layer and the at least two adjacent electrically conductive leads to shunt the at least two adjacent electrically conductive leads with the resistive composite material over a contact area in dependence on the received force to result in a pressure dependent electrical resistance between the conductive leads, and wherein the pocket structure is provided with a relief structure of micro bumps and an opening to reduce the counter force of the gas, said opening being dimensioned to impede the gas from exiting the pocket.

13. The method according to claim 12, wherein the spacer has a height, between the carriers, in a range between 0.5 and 500 micrometer and a width in a range between 0.5 and 2 cm.

14. The method according to claim 12, wherein depositing the at least two adjacent electrically conductive leads, and/or depositing the composite material, and/or depositing the spacer comprises printing.

15. The pressure sensor according to claim 8, wherein the electrically resistive layer exhibits a sheet resistance of about 30 kiloOhms/cm$^2$.

16. The pressure distribution sensing product according to claim 11, wherein the opening is formed in the spacer.

17. The pressure distribution sensing product according to claim 11, wherein the pocket structure has a height, between the carriers, in a range between 0.5 and 500 micrometer and a width in a range between 0.5 and 2 cm.

18. The pressure distribution sensing product according to claim 11, wherein the first carrier, the second carrier, and the spacer are formed of a composition comprising an elastomeric material having an elastic modulus below about 100 MPa.

19. The pressure distribution sensing product according to claim 11, wherein the electrically resistive composite material comprises an interconnected network of conductive micro-particles in an elastomeric polymer matrix.

20. The pressure distribution sensing product according to claim 11, wherein the pattern is arranged to, upon closing of the gap, form a gradually, and in a radial direction, increasing contact area between the electrically resistive layer and the at least two adjacent electrically conductive leads.

* * * * *